(12) United States Patent
Callard

(10) Patent No.: US 10,374,947 B2
(45) Date of Patent: Aug. 6, 2019

(54) METHOD AND APPARATUS FOR ENCAPSULATING / DECAPSULATING DATA PACKETS AT A RADIO ACCESS NODE

(71) Applicant: Aaron James Callard, Ottawa (CA)

(72) Inventor: Aaron James Callard, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 15/715,454

(22) Filed: Sep. 26, 2017

(65) Prior Publication Data

US 2018/0097722 A1    Apr. 5, 2018

Related U.S. Application Data

(60) Provisional application No. 62/402,366, filed on Sep. 30, 2016, provisional application No. 62/442,110, filed on Jan. 4, 2017.

(51) Int. Cl.
| | |
|---|---|
| *H04W 88/08* | (2009.01) |
| *H04L 12/721* | (2013.01) |
| *H04L 12/46* | (2006.01) |
| *H04L 12/717* | (2013.01) |

(52) U.S. Cl.
CPC .......... *H04L 45/38* (2013.01); *H04L 12/4633* (2013.01); *H04L 12/4641* (2013.01); *H04L 45/42* (2013.01); *H04L 2212/00* (2013.01); *H04W 88/08* (2013.01)

(58) Field of Classification Search
CPC .... H04L 45/38; H04L 12/721; H04L 2212/00
USPC .................................................. 370/328, 329
See application file for complete search history.

(56) References Cited

U.S. PATENT DOCUMENTS

| | | | | |
|---|---|---|---|---|
| 9,391,895 B2* | 7/2016 | Ueno | ................... | H04L 45/745 |
| 2006/0023718 A1* | 2/2006 | Joly | ..................... | H04L 45/245 |
| | | | | 370/392 |
| 2009/0034519 A1* | 2/2009 | Kashyap | ................ | H04L 29/06 |
| | | | | 370/389 |

(Continued)

FOREIGN PATENT DOCUMENTS

| | | |
|---|---|---|
| CN | 102984759 A1 | 3/2013 |
| EP | 2306676 A1 | 4/2011 |
| EP | 2744260 B1 | 8/2012 |

OTHER PUBLICATIONS

International Search Report dated Dec. 19, 2017 for corresponding International Application No. PCT/CN2017/104019 filed Sep. 28, 2017.

(Continued)

*Primary Examiner* — Jinsong Hu
*Assistant Examiner* — Farideh Madani

(57) ABSTRACT

A method and apparatus for handling a packet. The packet handling may include receiving the packet, associating the packet with configuration information, and performing packet handling operations on the packet according to packet handling instructions defined by the configuration information. A method and apparatus for encapsulating packets, decapsulating packets, or both, at a radio access node. The encapsulation and/or decapsulation operations are performed based on updateable configuration information specifying the operations to be performed without having to process the packet using the protocol with which it has been encoded.

28 Claims, 18 Drawing Sheets

(56) References Cited

U.S. PATENT DOCUMENTS

| | | | | |
|---|---|---|---|---|
| 2011/0185262 A1* | 7/2011 | Kershaw | .............. | H04B 7/0619 |
| | | | | 714/776 |
| 2014/0347435 A1* | 11/2014 | Barazany | ................. | H04N 7/15 |
| | | | | 348/14.07 |
| 2015/0155922 A1* | 6/2015 | Bi | ........................ | H04L 1/1841 |
| | | | | 370/329 |
| 2018/0097722 A1* | 4/2018 | Callard | ................... | H04L 45/38 |

OTHER PUBLICATIONS

General Packet Radio System (GPRS), "Tunnelling Protocol User Plane" (GTPv1-U) 3 GPP TS 29.281 V.12.1.0 Release 12. Jan. 21, 2015.
"Radio Bearer Reconfiguration", 3GPP TSG-RAN WG2, Meeting #93bis. R2-162350., Dubrovnik, Croatia, Apr. 11-15, 2016.
"Using ASN.1 to Describe 3GPP Layer 3 Message Formats"; Objective Systems, Inc., Jul. 2012.
"How can POF benefit Service Providers & Network Operators"; POForwarding, Dec. 19, 2016.
POFController Overview, Prototype | POForwarding, Dec. 19, 2016.
"Service Chaining in Carrier Networks"; White Paper; Feb. 2015.
"5G: flexibility or high performance? Both!"; Erricsson Research Blog, Dec. 19, 2016.

* cited by examiner

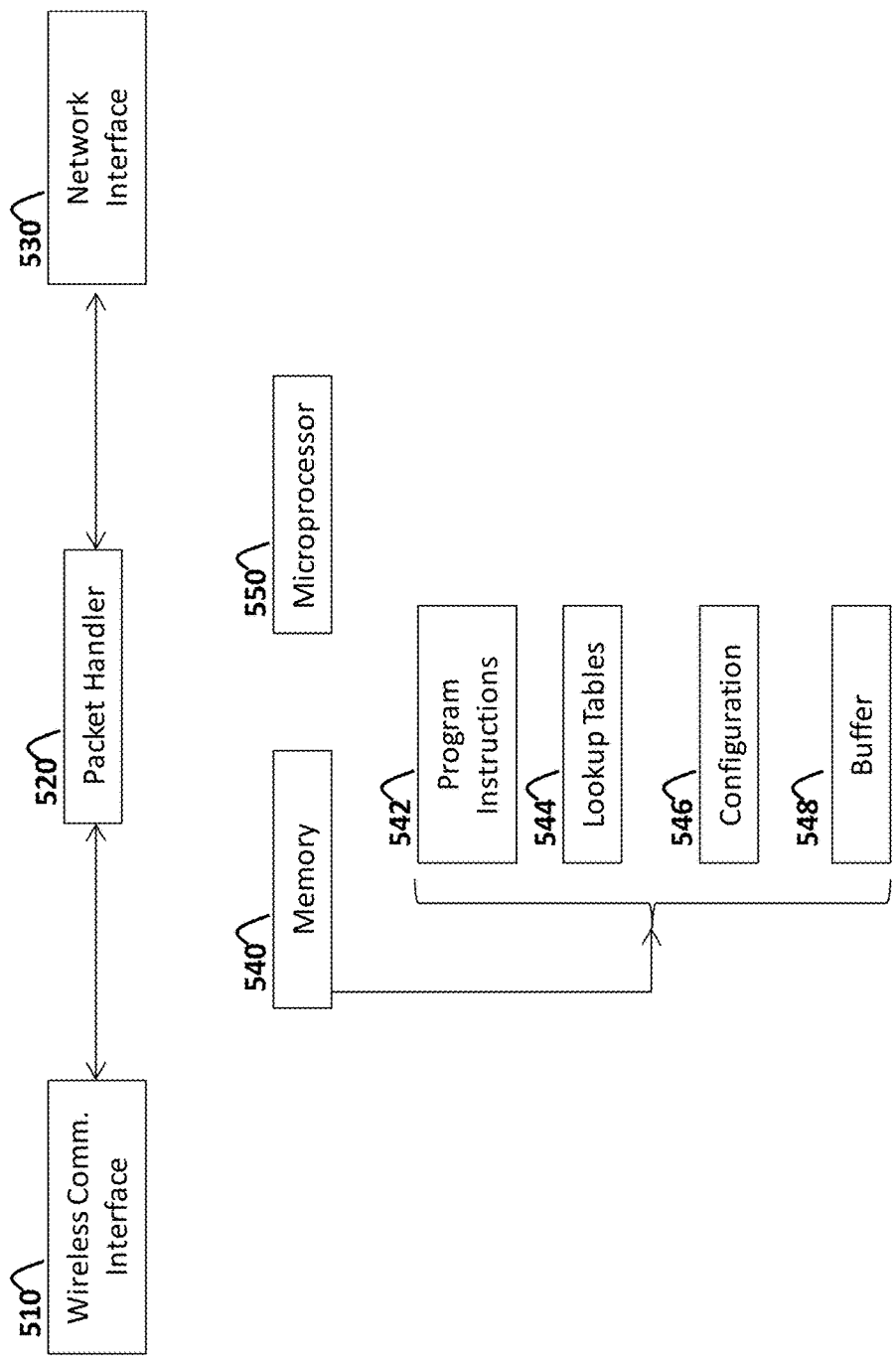

| Octets | Bits |  |  |  |  |  |  |  |
|---|---|---|---|---|---|---|---|---|
|  | 8 | 7 | 6 | 5 | 4 | 3 | 2 | 1 |
| 1 | Version | | | PT | (*) | E | S | PN |
| 2 | Message Type |||||||||
| 3 | Length (1st Octet) |||||||||
| 4 | Length (2nd Octet) |||||||||
| 5 | Tunnel Endpoint Identifier (1st Octet) |||||||||
| 6 | Tunnel Endpoint Identifier (2nd Octet) |||||||||
| 7 | Tunnel Endpoint Identifier (3rd Octet) |||||||||
| 8 | Tunnel Endpoint Identifier (4th Octet) |||||||||
| 9 | Sequence Number (1st Octet)$^{1)\,4)}$ |||||||||
| 10 | Sequence Number (2nd Octet)$^{1)\,4)}$ |||||||||
| 11 | N-PDU Number$^{2)\,4)}$ |||||||||
| 12 | Next Extension Header Type$^{3)\,4)}$ |||||||||

NOTE 0: (*) This bit is a spare bit. It shall be sent as '0'. The receiver shall not evaluate this bit.
NOTE 1: 1) This field shall only be evaluated when indicated by the S flag set to 1.
NOTE 2: 2) This field shall only be evaluated when indicated by the PN flag set to 1.
NOTE 3: 3) This field shall only be evaluated when indicated by the E flag set to 1.
NOTE 4: 4) This field shall be present if and only if any one or more of the S, PN and E flags are set.

FIG. 19 (PRIOR ART)

| Parameter | Value | Location | Pattern |
|---|---|---|---|
| IP address | 1.1.1.1 | n/a | |
| NG Protocol | 0x11 | n/a | |
| NG Sanity Check | 2123 (0x84B) | 16-31 | |
| Format ID Loc | | 64-79 | |
| PDU-ID Loc | | 96-119 | |
| QoS ind. Loc | | 120-123 | |

METHOD AND APPARATUS FOR ENCAPSULATING / DECAPSULATING DATA PACKETS AT A RADIO ACCESS NODE

CROSS REFERENCE TO RELATED APPLICATIONS

This application claims the benefit of priority to U.S. Provisional Patent Application Ser. No. 62/402,366 filed on Sep. 30, 2016 and entitled METHOD AND APPARATUS FOR ENCAPSULATING/DECAPSULATING DATA PACKETS AT A RADIO ACCESS NODE, and to U.S. Provisional Patent Application Ser. No. 62/442,110 filed on Jan. 4, 2017 and entitled METHOD AND APPARATUS FOR ENCAPSULATING/DECAPSULATING DATA PACKETS AT A RADIO ACCESS NODE, the contents of each of which are incorporated by reference.

FIELD OF THE INVENTION

The present invention pertains to the field of packet-based data communications and in particular to a method and apparatus for performing packet handling operations including encapsulating and/or decapsulating data packets.

BACKGROUND

In the field of packet-based networked data communications, there has been recent development towards the use of protocol independent forwarding (PIF) technologies. Using such technologies, routers do not decode the received packet using the protocol in which the packet was encoded, and instead, a router will treat the received packet as a bitstream and will look for an address to forward the traffic to based on a pre-defined bit field location within the bitstream that is specified in a router configuration file. Such routers therefore do not need to understand the protocol used to define the packet format used for the received packet.

Two current implementations of this concept of PIF are referred to as Protocol Oblivious Forwarding (POF) and Programming Protocol-Independent Packet Processors (P4). Routers using POF or P4 treat received packets as a bitstream and obtain routing information based on a series of {offset, length} fields in a configuration file. The offset value determines how far into a bitstream the router should go to access the beginning of the relevant data, and the length indicates the length of the relevant data starting at the offset. This provides a form of protocol abstraction and enables packet forwarding devices to support forwarding of packets that may be defined using a new packet protocol without the forwarding devices having to be reconfigured or reprogrammed to understand that new packet protocol. For example, an {offset, length} field of {96, 32} can be used to designate the source IP address in a data packet.

Data packet encapsulation is a known technique by which one data packet is included within another. For example, a first data packet can be encapsulated within a second data packet (e.g. formatted according to a different protocol) by including the first data packet within the data field of the second data packet.

However, currently there is a lack of capability to encapsulate or decapsulate data using protocol independent routines.

Therefore, in some embodiments there is a need for a method and apparatus for encapsulating and/or decapsulating data packets, incorporating protocol independence, that obviates or mitigates one or more limitations of the prior art.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide a method and apparatus for encapsulating data packets, incorporating protocol independence. In accordance with embodiments of the present invention, there is provided a method for encapsulating uplink packets received from a mobile device by a radio access node, the method comprising: receiving an uplink packet at the radio access node; and performing operations on the uplink packet according to packet handling instructions defined by configuration information, the operations performed independently of the protocols used in formatting the uplink packets.

In accordance with embodiments of the present invention, there is provided a method for decapsulating downlink packets for a mobile device by a radio access node, the method comprising: receiving a downlink packet at the radio access node; and performing operations on the downlink packet according to packet handling instructions defined by configuration information, the operations performed independently of the protocols used in formatting the downlink packet.

In accordance with embodiments of the present invention, there is provided a method for configuring a radio access node, comprising automatically, by a configuration controller, generating and transmitting configuration information to the radio access node, wherein the configuration information is indicative of one or more encapsulation or decapsulation operations to be performed by the radio access node on packets received thereby, the configuration information specifying the one or more encapsulation operations independently of protocols used in formatting the packets.

In accordance with embodiments of the present invention, there is provided a radio access node comprising a wireless communication interface, a network interface, a memory, and a microprocessor, the radio access node configured to encapsulate uplink packets received via the wireless communication interface, according to the above-described method.

In accordance with embodiments of the present invention, there is provided a radio access node comprising a wireless communication interface, a network interface, a memory and a microprocessor, the radio access node configured to decapsulate uplink packets received via the wireless communication interface, according to the above-described method.

In accordance with embodiments of the present invention, there is provided a controller node comprising a network interface, a memory and a microprocessor, the controller node communicatively coupled to a radio access node via the network interface, the controller node configured to configure the radio access node according to the above-described method.

In some embodiments, a method is provided for handling a packet by a radio access (RA) node, the method comprising the RA node: receiving the packet; associating the packet with configuration information; and, performing packet handling operations on the packet, without the RA node using the protocol with which the packet has been encoded, according to packet handling instructions defined by the configuration information.

In some embodiments, a network function is provided. The network function comprising: a network interface for receiving data from and transmitting data to network functions connected to a network; a processor; and a non-transient memory for storing instructions that when executed by the processor cause the network function to be configured to: receive the packet; associate the packet with configuration information; and, perform packet handling operations on the packet, without the network function having to process the packet using the protocol with which the packet has been encoded, according to packet handling instructions defined by the configuration information.

In some implementations, the configuration information is based on a radio bearer associated with the packet.

In some implementations, the configuration instructions are associated based on data outside the bitstream of the packet. In some implementations, the data outside the bitstream of the packet comprises a radio bearer associated with the packet.

In some implementations, the packet handling instructions comprise fixed rules, and wherein the packet handling operations treat the packet as a bitstream and apply the fixed rules to the bitstream. The fixed rules may indicate data in the bitstream and indicate operations to be performed on that data, and wherein the data is indicated by the fixed rules defining an offset number of bits into the bitstream that specifies a beginning of the data and a length number of bits that specifies a number of bits occupied by the data from the offset.

In some implementations, the RA node receives the configuration information from a controller node. In some implementations, the RA node transmits the packet as directed or modified by the packet handling instructions. In some implementations, the packet handling operations comprise one or more encapsulation operations.

In some implementations, the packet comprises an uplink packet, and wherein the packet handling operations include the RA node appending or prepending an encapsulation header onto the uplink packet. In some implementations, the one or more packet handling operations comprise one or more decapsulation operations.

In some implementations, the packet comprises a downlink packet intended for a user equipment (UE), and wherein the packet handling operations further comprise the RA node: retrieving a payload from the packet; and, transmitting at least payload contents based on the payload to the UE.

In some implementations, the packet comprises a downlink packet, and wherein the packet handling operations performed by the RA node comprise: reading a radio bearer identifier (RB-ID) located an offset number of bits within the downlink packet, the offset specified by the configuration information; mapping the downlink packet to a radio bearer based at least in part on the RB-ID; reading a payload from the downlink packet; and transmitting the payload toward the radio bearer.

In some implementations, the packet handling instructions specify an operation to be performed on a portion of packet data of the packet, and specify an offset indicative of an offset bit located a count of bits from a predetermined starting bit position within the packet; and a length indicative of the packet data as a count of bits from the offset bit.

In some implementations, the predetermined starting bit position comprises a starting bit of the packet.

In some implementations, the packet handling operations comprise a standardized set of actions to be taken, and wherein a portion of the packet to be operated on by the set of actions is configurable through the configuration information.

In some implementations, the portion of the packet is configurable by the RA node: receiving updated configuration information, the updated configuration information specifying an updated portion of the packet; and, replacing existing configuration information with the updated configuration information.

BRIEF DESCRIPTION OF THE FIGURES

Further features and advantages of the present invention will become apparent from the following detailed description, taken in combination with the appended drawings, in which:

FIG. 5 illustrates a general computing platform used in implementing embodiments of the present invention.

FIG. 19 illustrates GTP-U receiver output, in accordance with the prior art.

FIG. 22 lists the shared parameters used in GTP-U v1 along with the location of the relevant fields in accordance with representative embodiments of the present invention.

It will be noted that throughout the appended drawings, like features are identified by like reference numerals.

DETAILED DESCRIPTION

Figure 1:
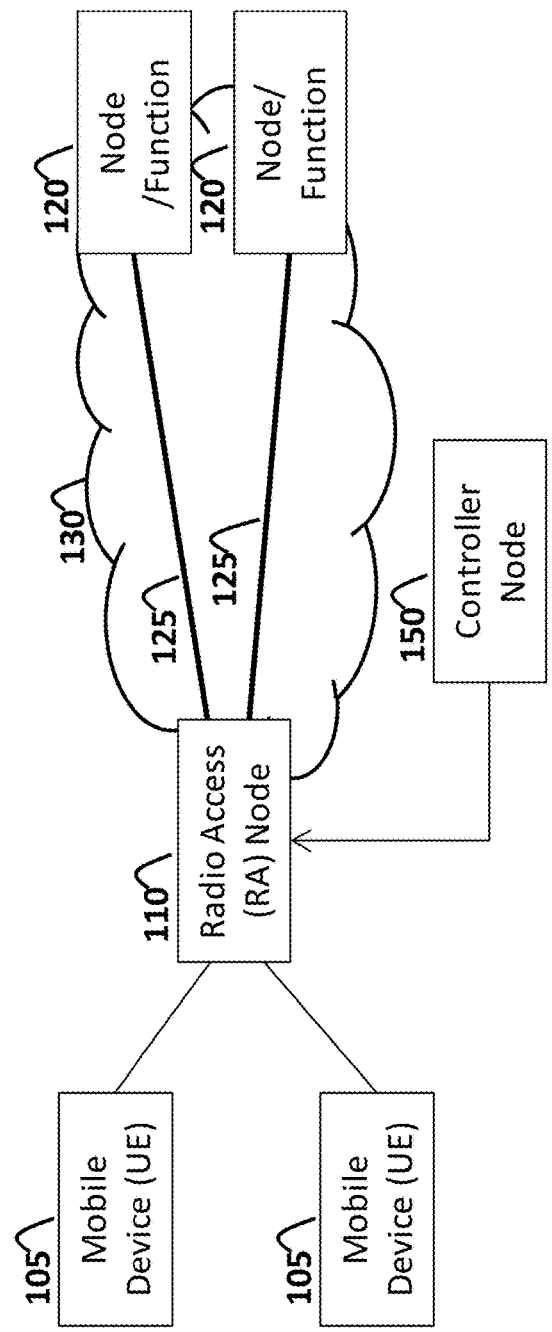
FIG. 1 illustrates a wireless communication system environment related to embodiments of the present invention.

Standards bodies such as the 3$^{rd}$ Generation Partnership Project (3GPP) typically take long periods of time to establish new standards or vary existing standards. When it is desired to add new protocols in a standardized communication architecture without being subjected to the procedures of the standards bodies, alternative approaches are required. The approach taken according to embodiments of the present invention is to establish (e.g. standardize) a generalized or protocol-independent format for certain operations, particularly for packet encapsulation or decapsulation. In embodiments of the present application, packet forwarding devices can be modified to support new packet protocols by simply changing a configuration file containing configuration information that specifies how packets can be treated without having to process the packet using the protocol with which it has been encoded to determine how it should be handled. This can be done without undergoing extensive standardization change procedures, of modifying/updating the packet forwarding devices to fully process the packet protocol used for a particular packet. This allows for future proofing of operations as packet protocols can be adjusted for use by end devices and new packet protocols can be added quickly. As such, a protocol independent (also referred to as protocol oblivious or agnostic) encapsulation/decapsulation method and associated apparatus are provided.

One potential benefit of this approach is to allow generic radio access (RA) nodes, acting as packet forwarding devices, to support multiple different service function chaining (SFC) implementations, with limited to no standards changes and limited to no changes in the functionality of the RA nodes. In an implementation, a template configuration file containing configuration information may be provided to the RA nodes that maps bit locations in the bitstream to relevant information required by the RA nodes to forward the received packets to the correct destination. The RA node is then operative to apply the corresponding configuration information to perform forwarding operations on the received packet. This can allow for increased flexibility and decreased costs due to the reduced dependence on specialized hardware, such as but not necessarily limited to GTP-U hardware.

Embodiments of the present invention provide for the use of protocol independence in encapsulating traffic at a RA node of a communication network which supports endpoints or other devices via wireless communication. The RA node may be any of a number of different nodes providing radio access to the Radio Access Network (RAN), such as a NodeB, an evolved node B (eNodeB) of an LTE network, a next-generation access node such as a gNodeB, other types of base stations, and other types of RA nodes that provide connectivity to UE.

One of the ways in which embodiments of the present invention differ from protocol independent forwarding implementations, such as POF, is in the availability of data outside the bitstream of the data to be routed. In PIF, POF and P4, routing and forwarding of data is performed solely as a function of data extracted from the bitstream of the received packet. In embodiments of the present invention, the channel (or radio bearer) over which a bitstream is received, can be used as an index in a local lookup operation. The lookup operation can be used to obtain information used to determine how the bitstream is to be treated at the RA node. Treatment at the RA node may include how a packet is encapsulated, where a packet is forwarded, and other such information. This allows for accessing locally stored data at the RA node which enables the RA node to determine bitstream treatment in accordance with intrinsic configuration information that is intrinsically contained within the bitstream (e.g. data fields within the bitstream, and the port or channel that the bitstream is received over) as well as extrinsic information (e.g. data stored in a table that can be accessed using the intrinsic information). This can allow for an RA node to ensure QoS requirements are expressed or enforced, to enforce policy configuration and protocol treatment for received data that does not explicitly include this information. Conventional PIF implementations are restricted to making decisions based on intrinsically contained data, which means that if, for example, a QoS requirement is not indicated in the received bitstream, the PIF node would not be able to ensure that subsequent network nodes enforce the requirement. By allowing an extrinsic data source, such as a table that is locally accessible to the RA node, to be used, an RA node can attach a QoS indicator to data received over a particular radio bearer. In an alternative embodiment, the RA node can evaluate a received packet and classify the received packet based on the configuration information that may indicate a specified QoS level or indicator associated with that data. The RA node may then attach the associated QoS indicator to the received packet. In some implementations, the RA node may be operative to apply the classification to all received packets that share or match specific configuration information, such as all packets received over a particular radio bearer. The QoS indicator can then be determined by consulting extrinsic data such as a table locally accessible to the RA node, the table indicating that uplink data from the given radio bearer should be associated with a particular QoS indicator.

Those skilled in the art will appreciate that policy configurations, and protocol treatment can be handled in a similar fashion for uplink traffic. It will also be understood that a series of decisions can be made. For example, the radio bearer over which uplink data (i.e. uplink packets) are received can be one of the factors used in determining packet treatment, and in addition an offset and length can be specified to identify a protocol version (e.g. IPv4 vs. IPv6), which would then determine how a QoS indicator determined by the radio bearer should be associated with the received uplink data (i.e. uplink packets). In the downlink direction, a RA node can read a portion of data (e.g. a destination address) from a specified location in a received bitstream of data (i.e. uplink packet) and use the read data as the lookup value in a locally accessible stored table to determine a radio bearer over which the received bitstream of data should be transmitted. This may include RB-ID information to determine which radio bearer to use for transmission, for example. For the uplink, the present invention may provide information such as device identifiers, RB-ID information, time of first transmission etc., which are then incorporated into the payload sent into the transport network layer (TNL).

As used herein, the term "User Equipment" (UE) is used for purposes of clarity. However, the UE may refer to one of a variety of devices, generally referred to herein by the term "mobile devices" and including mobile stations, terminals or nodes, fixed or stationary devices, stations, terminals, machine-type communication (MTC) devices, or other wireless end nodes, which communicate with a RA node via wireless communication. One skilled in the art will appreciate that a mobile device is a device designed to connect to a mobile network. This connection typically makes use of a wireless connection to an access node. Although the mobile network is designed to support mobility, it is not necessary that the mobile device itself be mobile. Some mobile devices, such as metering devices (e.g. smart meters) may not be capable of mobility, but still make use of the mobile network.

FIG. 1 illustrates a wireless communication system environment related to embodiments of the present invention. Mobile devices UE 105 access the wireless communication network via radio communication with a RA node 110. Communication tunnels 125 are established through the transport network 130 to specified end nodes or functions 120, such as, for instance, gateways (e.g. packet or serving gateways), service functions, other RA nodes, and a variety of different application servers. The transport network 130 may include intermediate devices such as routers. The configuration of the RA node 110 is performed by a controller node 150. Those skilled in the art will appreciate that the RA node 110 may be controlled by an element manager which may be located at the RA node 110, the controller node 150, or another node of the transport network 130. In an uplink scenario, the RA node 110 is configured to encapsulate uplink packets received from the mobile devices 105 to facilitate their handling by the transport network 130. Typically, uplink packets received by the RA node 110 are received over a radio bearer and are encapsulated so that they can be sent through a logical tunnel. A single UE 105 may transmit uplink packets on a plurality of different radio bearers to the RA node 110, for instance each radio bearer may be dedicated to a different application or group of applications. In a downlink scenario, the RA node 110 is configured to decapsulate downlink packets received from the transport network 130 to facilitate their transmission to the mobile devices 105. The RA node 110, upon receipt of a packet for transmission to the mobile device UE 105, determines which radio bearer to use in transmitting the downlink packet. It is noted that the RA node 110 may have multiple network interfaces, with different interfaces configured differently based on configuration information.

In communication networks such as LTE networks, the RA node 110 handles uplink packets from mobile devices (UEs) in part as follows. The RA node 110 generates an encapsulation header which is specific to a particular UE's protocol data unit (PDU) session. The RA node 110 prepends the generated encapsulation header to the UE's PDU to generate a packet suitable for transmitting over a tunnel. The RA node 110 then transmits the generated packet on the TNL. Different proposed protocols have varying degrees of shared parameters between the encapsulation headers of different PDU sessions. Examples of encapsulation protocols include general packet radio service (GPRS) tunnelling protocol (GTP) on top of user datagram protocol (UDP) on top of internet protocol (IP), generic routing encapsulation (GRE) on top of IP, and IP only.

Figure 2:
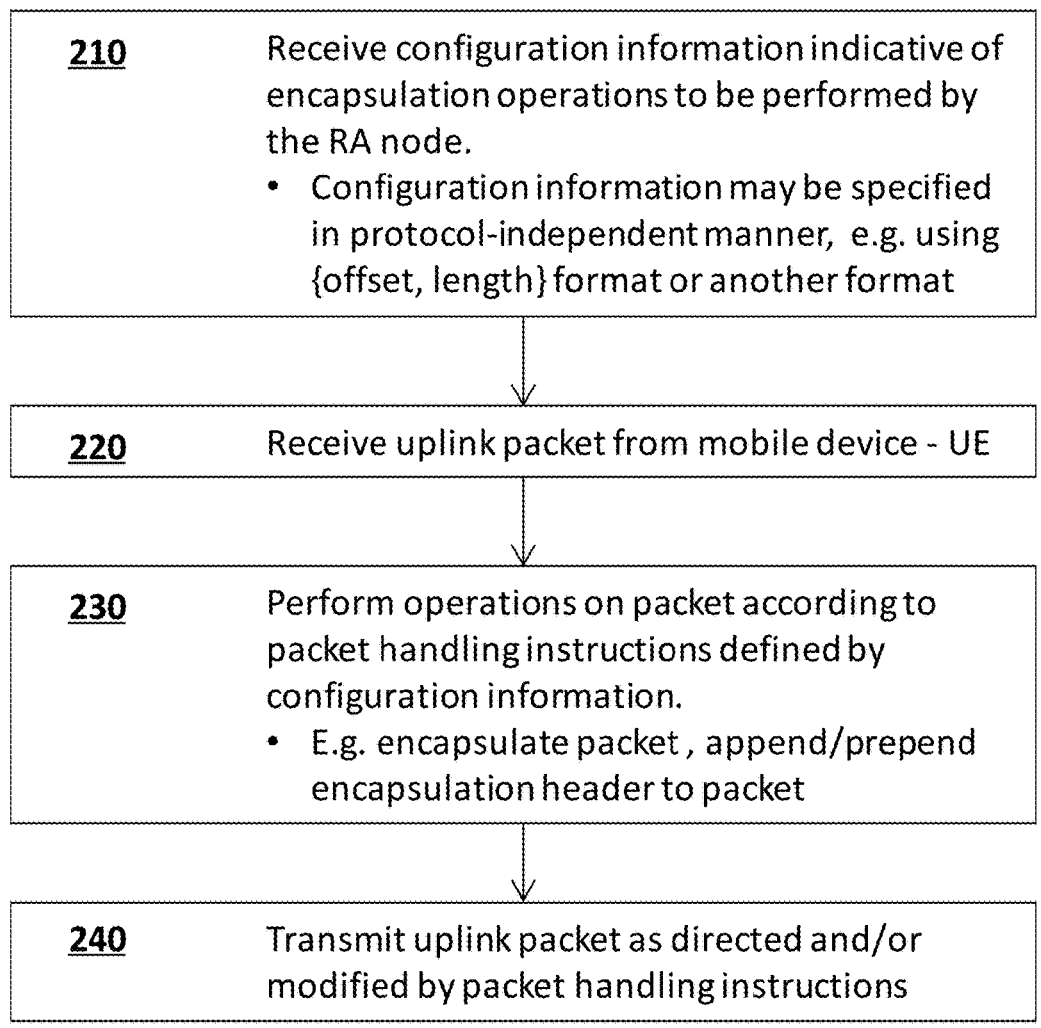
FIG. 2 illustrates an encapsulation method provided in accordance with an embodiment of the present invention.

To support such packet handling, according to one embodiment of the present invention, and with reference to FIG. 2, there is provided a method for handling uplink packets by a RA node 110. In some implementations, the packet handling may include encapsulation. The method comprises receiving 210 configuration information indicative of encapsulation operations to be performed by the RA node 110. The configuration information specifies the encapsulation operations in a manner which is independent (oblivious/agnostic) to the packet protocols according to which the uplink packets are encapsulated.

A connected UE 105 transmits uplink packets to the RA node 110 which receives the uplink packets, but need not have access to the packet protocols or have information detailing the structure of the received uplink packets. Since the RA node 110 lacks the packet protocols, it receives the uplink packets as a bitstream of uplink data. Packet handling operations are performed by the RA node 110 on the uplink data using the configuration information. Accordingly, the packet handling operations are dependent upon the received uplink data having been structured according to the packet protocols, but the RA node 110 only needs to follow the instructions provided by the configuration information and operate on the received uplink packets as a bitstream of uplink data, without having access to the packet structure(s) of each received uplink packet.

The configuration information may be in the form of a configuration file containing the configuration information received from a controller node 150 via a network interface of the RA node 110. In some embodiments, when the RA node 110 includes multiple TNLs or TNL interfaces, the configuration information (e.g. template), associated with uplink connections, may specify which TNL interface to use, along with TNL parameters to be used. The configuration information associated with downlink connections, may be specific for a particular TNL. Examples of multiple TNL interfaces may be multiple IP addresses, Ethernet addresses or virtual connections defined through tunneling protocols. The method further comprises receiving 220 uplink data (i.e. an uplink packet) from a mobile device UE 105. The uplink data (i.e. uplink packet) is wirelessly received by the RA node 110 from the mobile device UE 105. As indicated above, the RA node 110 need not have access to the protocols defining the received uplink packet, and accordingly may treat the received uplink packet as a bitstream of uplink data. As also indicated above, in some implementations the method may further comprise the RA node 110 classifying the uplink data based on configuration information. The classification may be based, for instance, on the radio bearer associated with the uplink data.

The method further comprises performing 230 one or more encapsulation operations on the received uplink data (i.e. uplink packet) in accordance with packet handling instructions defined at least partially by the configuration information. These encapsulation operations may include encapsulating the uplink data (i.e. uplink packet), for example by generating an encapsulation header and appending or prepending the encapsulation header to the uplink data, or otherwise including the encapsulation within the uplink data. The operations are again performed in a manner which is independent (oblivious/agnostic) to the packet protocols according to which the uplink packets were formatted. The method further comprises transmitting 240 the uplink data (i.e. received uplink packet), as directed or modified based on the configuration information.

In one embodiment, the packet handling instructions can be stored within a configuration file containing configuration information that is sent to the RA node 110. The RA node 110 can then access the packet handling instructions directly from the configuration information during operation. These packet handling instructions can be, as discussed elsewhere in the disclosure, in the form of a table that allows for determination of how encapsulation and packet handling occur in response to the bit values specified in predetermined locations in the uplink data. In another embodiment, the RA node 110 can self-configure in accordance with the configuration information, thereby compiling the instructions into appropriate actions to be performed by the RA node 110. The packet handling instructions can include instructions for encapsulating the uplink data (i.e. uplink packet). The packet handling instructions can be provided in the form of a template, which describes in general the packet handling operations to be performed.

In some embodiments, the operations of the present invention are applied after successful processing of underlying protocol layers. In some embodiments, if the underlying protocol layers are not successfully processed, operations of the present invention are omitted. In some embodiments, for particular fields relevant to the underlying protocols of a packet (UDP port numbers, GTP-U TEID fields, etc.) a template may be specified. In some embodiments, upon reading certain predetermined TEID values in the uplink data (i.e. value within an uplink packet) (or equivalent fields in other protocols), the RA node 110 may be configured to detect a particular further field located in a protocol agnostic manner. This further field is then matched with predetermined information accessible to the RA node 110, and the radio bearer is determined based on the same predetermined information.

For instance, one or more protocol fields may be associated with protocol oblivious encapsulation (PoE) type tunnels, and forwarding may then be supported based upon these protocol fields. These PoE type tunnels are associated with particular TEID (or equivalent) values. When an RA node 110 reads such a particular TEID value in the uplink data, the RA node 110 is operative to classify the uplink data with corresponding configuration information and accordingly responds by accessing the appropriate template containing the corresponding configuration information, which indicates where additional fields to be used for radio bearer (RB) selections are located. Those fields are then used for RB selection. In short, the content of certain protocol fields is used to select one of a plurality of templates, and the selected template is then used to specify further fields, the content of the further fields being used as a basis for RB selection. By using different TEIDs, the CN can utilize several different field configurations for different forms of traffic, and accordingly the RA nodes 110 may be operative to differentiate between a plurality of packet formats without being aware of the separate protocols that define each packet in its entirety. In an implementation, the RA nodes 110 may be operative to differentiate by selecting the different corresponding configuration information for each of the different packet formats. This process can be interpreted as corresponding to lower layers. The process de-multiplexes over multiple fields and protocol layers (IP, UDP, TCP, GTP, GRE, etc.) and then determines which template to use.

In various embodiments, encapsulation of an uplink packet by a RA node 110 comprises reading designated data from the uplink data (i.e. uplink packet) in accordance with a template, performing a lookup operation in a lookup table according to the read data, and appending, prepending, or otherwise inserting data into the uplink data (i.e. uplink packet) in accordance with information obtained via the lookup operation.

In other embodiments, encapsulation of an uplink packet by a RA node 110 comprises determining the radio bearer over which the packet was received from the device UE 105. Based on the determined radio bearer, an appropriate template is selected by the RA node 110. The RA node 110 then appends, prepends or otherwise encapsulates the packet in accordance with the selected template. The RA node 110 then transmits uplink traffic using the TNL parameters associated with the selected template. It will be understood that the TNL parameters associated with the selected template will typically be inserted into the encapsulation header so that it can be read by other nodes.

It is recognized herein that encapsulation headers of uplink packets often contain a significant number of fixed fields, with respect to a PDU session, which do not need to be interpreted by a RA node 110. Embodiments of the present invention therefore limit the amount of interpretation that is performed by the RA node 110 when generating an encapsulation header according to the packet handling instructions. Rather than interpreting the fields of the received packet by decoding the packet according to the protocol in which it was encoded, the RA node 110 treats the received packet, including the header information, as a bitstream, or a bytestream where the packet is organized into bytes, of uplink data to be operated on according to fixed rules, such as reading a particular portion of the bytestream, and/or inserting data at a particular portion of the bytestream.

The configuration information may be transmitted to the RA node 110 by a controller node 150 such as a session manager of the wireless communication network 130. This controller node 150 may automatically generate the configuration information. Alternatively, the configuration information may be provided by an operator.

By way of example, embodiments of the present invention operate as follows. The RA node 110 receives and stores the configuration information, which describes how a particular radio bearer should be injected into the network 130. The configuration information includes instructions describing how the RA node 110 should operate on packets, e.g. to encapsulate the packets, in a manner which, to the RA node 110, is independent of the protocols by which those packets were created. It is noted that these commands are similar in some respects to PIF commands.

An example of a command specified by the configuration information is the command: SET_FIELD(from{field, offset, length}, to{field(packet), offset, length}, overwrite/insert). This command instructs the RA node 110 to either overwrite packet data, or insert packet data, at a specific location in the bitstream/bytestream depending on whether "overwrite" or "insert" is specified in the command. As will be readily understood, overwriting data corresponds to replacing existing bits within the bitstream of uplink data (i.e. locations of packet data) with new bits of packet data, whereas inserting data corresponds to adding the new bits of packet data at a specified location and appending the remainder of the packet data after the new bits.

The "from" portion of the command specifies a memory location or table entry from which the data to be inserted is to be retrieved by the RA node 110. The table entries may be held in a lookup table maintained by the RA node 110. The lookup table can be configured and maintained independently from the configuration file(s). The "field" specifies which named or numbered field of the table contains the data. This field table may represent one of multiple different memory locations which can either be UE specific, node specific or template specific. Examples of such are given in Table 6 (below). The "offset" specifies the beginning location of the data as a count of the number of bits from the beginning of the field. The "length" specifies the number of bits occupied by the data in the field beginning with the offset location.

The "to" portion of the command specifies the location that data is to be overwritten or inserted at. In various embodiments, the field parameter in the "to" portion is used to indicate the packet which is currently being processed. This can be given a particular meaning, e.g. the string 'packet', or may be the only option available. Alternatively, the field parameter can be another indexed field. An "offset" sub-portion specifies a count of the number of bits/bytes from the beginning of the bitstream of uplink data (i.e. beginning of the uplink packet) at which the insertion or overwrite is to begin. The offset value may be considered to indicate a first edge (i.e. the offset location) of a portion of the uplink data to be operated on as measured from a beginning point of the uplink data, or from a pre-defined initial field(s) of the uplink data. A "length" sub-portion specifies the number of bits/bytes of the data, as measured from the first edge (i.e. an offset location beginning at offset bits/bytes from the beginning point of the uplink) and extending a portion length of bits/bytes within the bitstream to a second edge of the portion of the uplink data. Accordingly, the portion length indicates a length value number of bits/bytes that are to be written into the bitstream of uplink data (i.e. written into the uplink packet). The value of the 'packet' field may refer to a particular protocol layer within the PDU which is being processed, and the offset values are then calculated with respect to that location. For example, the packet field may be above IP, above Ethernet, above UDP, after GTP-U, or other combinations. In such embodiments, the named protocol is known by the RA node 110 and the RA node 110 can process the fields associated with that protocol accordingly.

The SET_FIELD command, along with other similarly formatted commands, directs operations to be performed on a packet independently of the protocol-interpreted meanings of the various bits carried by the packet. However, the commands are typically structured in such a way that the packets are manipulated in a manner which is consistent with a predetermined protocol or set of protocols. As such, the packet can be subsequently interpreted as if the RA node 110 were designed explicitly and solely for packet manipulation according to a single, predetermined set of protocols.

A MATCH_ACTION command may be provided, which directs the RA node 110 to perform a designated action based on a designated field. For example, the MATCH_ACTION command can specify that the packet is to be forwarded to a designated radio bearer based on the designated field.

Another command is the LOOKUP table command. This command maps a value indicated by a field to another value which is written to a location expressed as another field based upon a lookup operation. This command receives a first field, as well as a table identifier, and returns a mapped field according to a table lookup operation. That is, table is searched to locate the specified first field, and another value, associated with the first field in the table, is returned. This command may be used for transforming one representation of bits to another. For example, CQI levels may be transformed to QCI levels via table lookup. For example, the table may include mappings 000→111, 010→101.

The LOOKUP table command may receive as input the table id, the input and output fields. An example format is Lookup(from{field, offset, length}, to{field(packet), offset, length}, table reference). The "from" and "to" fields are as defined above in relation to the SET_FIELD command. The table reference refers to the lookup table used for the mapping. This may be indicated within the template, or signaled separately through control plane signaling.

In some embodiments (e.g. for decapsulation of downlink packets) the role of the template is very limited and only provides the location of various fields, any further processing is performed outside of the scope of the template file. For example, in one embodiment the two values indicated are the device ID, and the QoS field. In this embodiment, the template indicates the location of those fields within the incoming PDU. This location can be indicated in several ways. A less complicated approach is to indicate the location using a (length, offset) pair value to indicate offset relative to a fixed protocol layer (i.e. IPv4). In some embodiments, negative values of offset may be interpreted as either bits in underlying headers, or wrapped around to the end of the packet. For example, an offset of. "−1" can represent the very last bit of the PDU. In other embodiments, negative values may be disallowed. The protocol layer referenced may also be indicated, as can the point within it, such as the first bit or last bit of the protocol, however this indication may be implicit as only a single protocol location may be acceptable. This may be the case, for instance, when the template is in the format of several information elements (IE) related to demodulation. For instance, one IE could be device_ID_location which may be equivalent to SET_FIELD with the 'to' field limited to only provide the device ID. It may be provided directly, in segments (e.g. with offsets, lengths still being allowed), through LOOKUP tables or a combination therein. Other fields such as QoS_location IEs may also be provided. Below we give an example description of various location fields defined in the ASN.1 format and expressed as follows:

```
Protocol_Layer ::= ENUMERATED
{
    IP (0)
    L2 (1)
    UDP  (2)
    RB_context (3)
    ...
}
Protocol_Layer_Loc ::= ENUMERATED
{
    Beginning (0)
    End (0)  ...
}
Field::= SEQUENCE {
    protocol_layer_ref Protocol_Layer,
    protocol_layer_loc Protocol_Layer_Loc
    offset  INTEGER,
    length INTEGER,
    bitstring BITSTRING,
}
device_ID_location ::= SEQUENCE(SIZE(0..4)) of Field
    QoS_location ::= SEQUENCE(SIZE(0..4)) of Field
    Count_location ::= SEQUENCE(SIZE(0..4)) of Field
    Payload_loc ::= SEQUENCE(SIZE(0..4)) of Field
```

In the above embodiment, the device ID is represented as a collection of up to 4 'fields' which are each represented by three parameters: a layer; a length; and an offset. The device ID is calculated by appending the multiple fields together to form the final device ID. The optional bitstring allows arbitrary fixed bitstrings to be placed within the fields. This is useful if there are multiple of these templates which are differentiated by some other means (i.e. TNL address (IP)). In other embodiments, the different fields over which the radio bearer is calculated are not given specific names and are given as a collection of generic named fields, which are given meaning by the template format. (i.e. SEQUENCE (SIZE(0 . . . 4)) of SEQUENCE(SIZE(0 . . . 4)) of Field_loc).

In some embodiments, an additional 'check' IE can be provided which prevents misconfigured packets from further processing. This check IE essentially provides a field location, as well as binary values (bits) that are expected there. These bits may be expressed as a fixed bitfield, or may correspond to the output of a particular function such as a CRC or checksum computation. The fields of which the function is calculated can also be indicated as a series of fields. This check IE may be used, for example, to determine whether the fixed fields in the GPT-U header are as expected. If the bits are not as expected then this packet can be discarded or otherwise processed differently.

In some embodiments, an additional parameter "payload_loc" representing the payload location can also be provided. This parameter may take the same format as the other location fields, or a different format.

In some embodiments, the template is limited to a small set of fields with limited functionality. These fields are configurable on a per-PDU session level, and received at least partially during PDU session setup. In one embodiment, a single bytestream can be provided to act as an encapsulation header. This bytestream is prepended to the PDU received from lower layers (e.g. Radio bearer etc.), and then transmitted on the TNL at a protocol layer. In ANS.1 this information element (IE) may be expressed as:

```
Encapsulation_Field ::= SEQUENCE {
    protocol_layer_ref Protocol_Layer,
    bitstring BITSTRING,
}
```

In some embodiments, additional fields may be added indicating, for instance, either what payload to append in certain conditions, or where to position particular fields used in UL.

The configuration information can refer to several different fields when referencing the "from" portion. These fields can include arbitrary bitstrings included in the template, or fields associated with a mobile device and stored in the RA node 110. Examples of such fields include a UE_ID or other mobile device identifier, and an identity of channel such as a radio bearer used for communicating with a mobile device UE 105. There may also be additional subfields associated with these traffic types, such as radio bearer, TEID, or Radio bearer QoS subfields. The set of subfields in use may be different for different radio bearers, different TNL interfaces, or different deployments.

Embodiments of the present invention provide for decapsulation (also referred to as unencapsulation or de-encapsulation) of downlink packets by the RA node 110, prior to wireless transmission of the downlink data to a target mobile device UE 105. In communication networks such as LTE networks, the RA node 110 handles downlink packets intended for mobile devices (UEs 105) in part as follows. The RA node 110 receives a PDU over the TNL. The RA node 110 then determines a field, referred to herein as the radio bearer (RB) identifier (RB-ID), located at a fixed offset from a known position in the packet. The RB-ID is used, possibly along with TNL parameters, to map the traffic to an appropriate radio bearer. In GTP-U the RB-ID corresponds to the tunnel endpoint identifier (TEID). However, for other encapsulation method the RB-ID may be a GRE key, or the inner IP address, depending on the preferred encapsulation header format. If configured, one or more 'check' fields (as described above) can be referenced.

In some embodiments, multiple fields may be simultaneously used to determine an appropriate radio bearer. These fields may represent elements such as QoS, user ID, slice ID, or other fields. Depending on the encapsulation format in use, these fields may be indicated at different locations within the packet. For example, for a packet using IP in IP, the user ID may be the inner IP destination field, or the flow ID field in either IPv6 header. The {offset, length} fields used to direct operation of the RA node 110 are configured with values representing such locations without further knowledge or packet interpretation required by the RA node 110. A QoS field, may be indicated in the differentiated services code point (DSCP) field of the inner (or outer) IP address carried by the packet, or in a field in a future protocol (e.g. Next Generation User Plane (NG-U) interface), the flow ID, or part of an IP address. A slice ID field may be represented by prefixes in the IP address. For example, the IP address of the UE 105 may be prefixed by a field which can be mapped to the slice ID.

To allow for different representations of different fields, in some embodiments the template may include a transformation format in which one set of sequences is mapped to another. An example of a transformation is 000→11001, 001→11101. This transformation can be implemented, for example, via a table lookup operation with a particular keyword i.e. lookup(x,y), where x is the input and y a mapping table, or through other features such as a goto-table feature similar to that specified in PoF.

Figure 3:
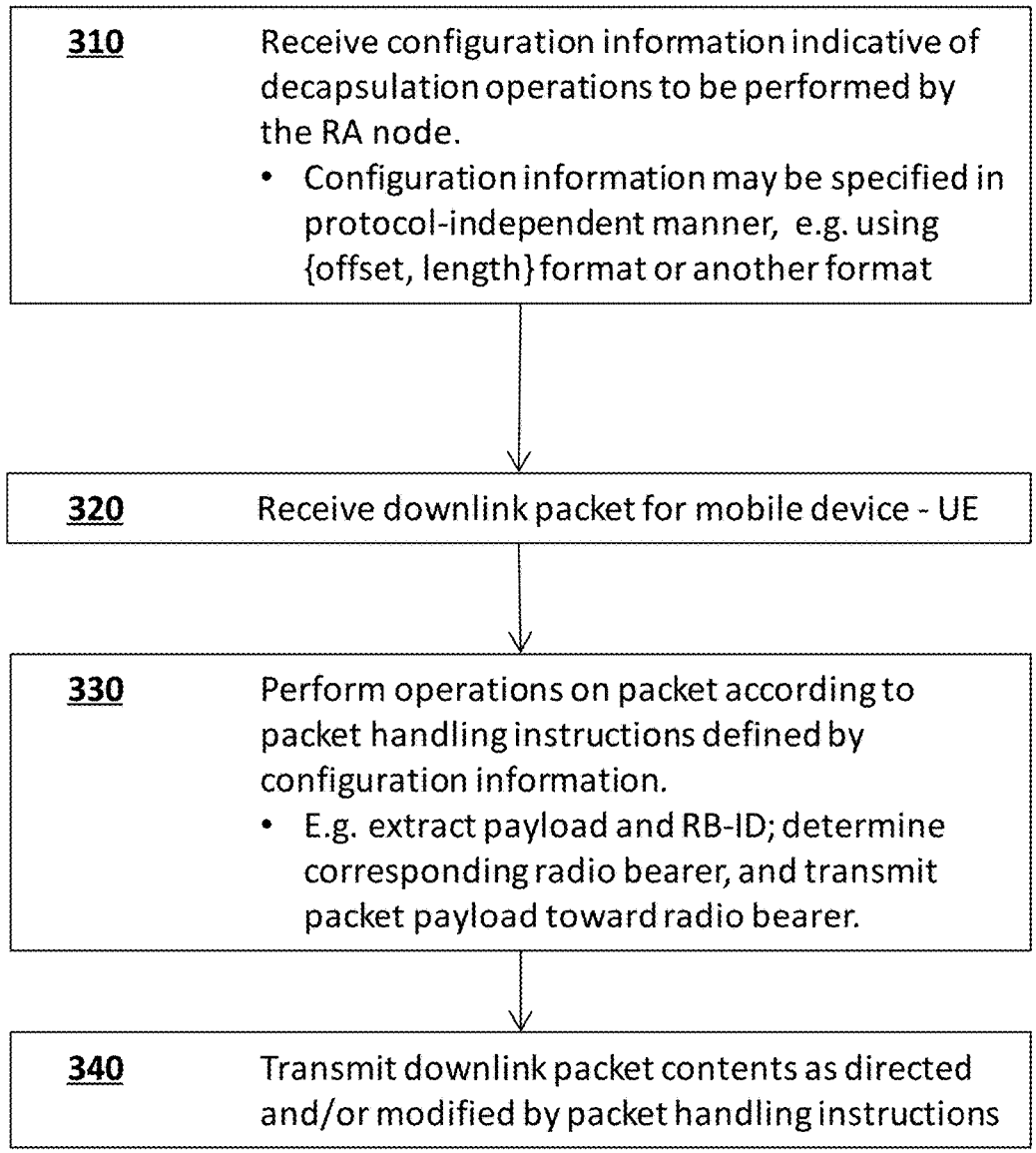
FIG. 3 illustrates a decapsulation method provided in accordance with an embodiment of the present invention.

Accordingly, and with reference to FIG. 3, there is provided a method for handling downlink packets by a RA node 110, for example including decapsulating the packets. The method comprises receiving 310 configuration information indicative of decapsulation operations to be performed by the RA node 110. The configuration information specifies the decapsulation operations in a manner which is independent (oblivious/agnostic) to the protocols according to which the downlink packets are formatted. The method further comprises receiving 320 a downlink packet intended for a mobile device. The downlink packet is received by the RA node 110 from another network node or mobile device UE 105. As indicated above, the RA node 110 may lack access to the packet protocols defining the structure of the received downlink packets. Accordingly, the RA node 110 may treat the received downlink packets as a bitstream of downlink data. As also indicated above, in some implementations, the method may further comprise the RA node 110 classifying each received downlink packet based on configuration information. The method further comprises performing 330 one or more operations on the downlink packet in accordance with packet handling instructions defined at least partially by the configuration information. The operations are again performed in a manner which is independent (oblivious/agnostic) to the protocols according to which the downlink packets are formatted, as the received downlink packets are treated as a bitstream of downlink data. As with encapsulation, the packet handling instructions may be read directly from a configuration file containing configuration information as part of performance of the operations or the RA node may self-configure according to the configuration information. The packet handling instructions can be provided in the form of a template and include instructions include instructions for de-encapsulating the uplink packet. The method comprises transmitting 340 at least payload contents of the downlink packet as modified or directed by the configuration information toward the mobile device UE 105.

In one embodiment, the operations include retrieving a RB-ID from the packet, and also retrieving a payload from the packet. The RB-ID can be retrieved using a protocol-independent command which specifies an offset and a length. The offset defines the number of bits/bytes into a bytestream of the packet at which the beginning of the RB-ID is located, and the length defines the number of bits of the RB-ID to be extracted. The bytestream may correspond to a fixed portion of the packet, for example following a dynamic portion. The payload can similarly be retrieved using another protocol-independent command which specifies at least an offset defining the number of bits/bytes into the bytestream of the packet at which the beginning of the payload is located.

In various embodiments, decapsulation of a received downlink packet by a RA node 110 comprises extracting designated data from the packet in accordance with a template, determining a radio bearer corresponding to the packet by analysis of the extracted data, and transmitting at least the payload of the packet toward the radio bearer.

Figure 4:
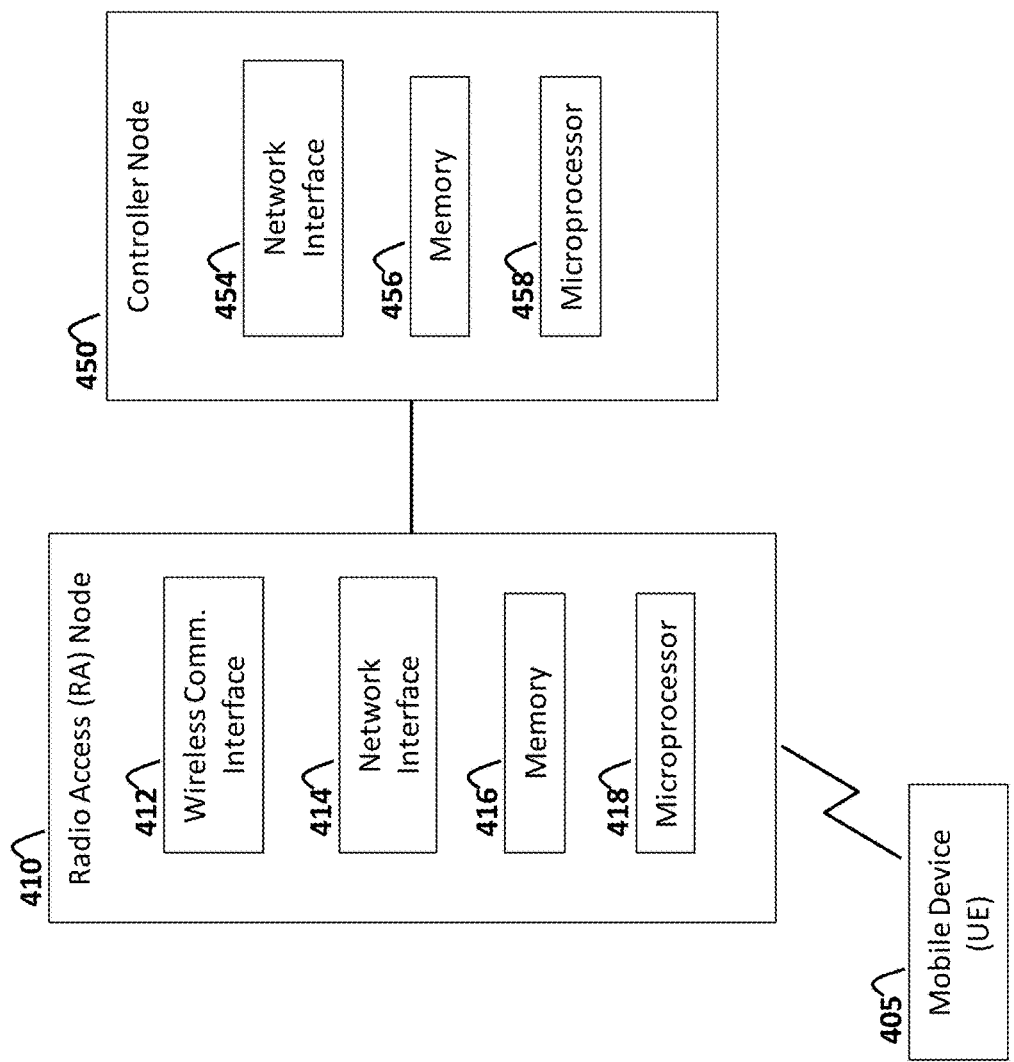
FIG. 4 illustrates apparatuses for performing and/or supporting encapsulation and/or decapsulation, in accordance with embodiments of the present invention.

Embodiments of the present invention provide for a RA node 410 configured to perform encapsulation and/or decapsulation as described herein for example with respect to FIGS. 2 and 3. With reference to FIG. 4, the RA node 410 comprises a mobile wireless communication interface 412 configured for communicating with mobile devices such as device UE 405, a network interface 414 configured to communicate with other devices such as the controller node 450 and other core network devices, a memory 416, and a microprocessor 418, or equivalent integrated circuit electronics sufficient for performing required computations and operations. The wireless communication interface may include a radio access network transmitter/receiver, for example. The RA node 410 may be operated using dedicated computing and communication hardware, or the RA node 410 may be a virtualized computing and communication device.

With further reference to FIG. 4, embodiments of the present invention provide for a controller node 450 of a wireless communication network, the controller node 450 configured to generate and transmit configuration information to a specified RA node 410. A corresponding method for execution by a controller node is also provided. The configuration information and its effect on the RA node is as described above with respect to the RA node, for example with respect to FIGS. 2 and 3. The controller node 450 comprises a memory 456, a microprocessor 458, or equivalent integrated circuit electronics sufficient for performing required computations and operations, and a network interface 454. The controller node 450 may be operated using dedicated computing and communication hardware, or the controller node 450 may be a virtualized computing and communication device.

It is noted that some RA nodes 410 may be dynamically configured or reconfigured as needed. Different RA nodes 410 can be configured differently depending on requirements. For example, an RA node 410 may be configured to perform encapsulation and/or decapsulation compatible with certain protocols of packets actually handled by the RA node 410, thereby simplifying its configuration and reducing overhead.

In some embodiments, the RA node 410 advertises, for example to the controller node 450, the information it is capable of generating and making accessible. The RA node 410 may advertise a list of fields that are available, for example via a control plane message. The fields may be identified by predetermined numerical identifiers, for example. In one embodiment, the identifier is in the form of a URL, with or without wildcards. For example, the type field may be referred to as a series of recursive data. One example is to access the BS_ID\UE_ID\PDU_FLOW_ID\. In this example UE_ID is an identifier of the particular device (T-IMSI etc.), and the PDU_FLOW_ID is an identifier related to a particular session request, in which a series of traffic handlings (i.e. DRB in LTE terms, or PDU Session) are indicated to the network. The BS_ID represents an identifier of the node that this process may be received upon. The BS_ID is typically implicit when there is a one to one mapping of node to a RA node 410 (e.g. gNodeB), however in scenario where there is additional mapping (e.g. where the mapping is not one-to-one) the BS_ID may be used to specify the particular node. The BS_ID may represent the carrier, transmit/reception point, RAT used etc.

FIG. 5 illustrates a computing platform configured according to embodiments of the present invention. The computing platform may comprise hardware components configured together to provide a RA node operating as described herein. Some hardware components can be located in the field, at a datacenter, or a combination thereof. The computing platform may also be used to provide other functions or network nodes. The platform comprises a wireless communication interface 510 configured to wirelessly communicate with mobile devices (e.g. UEs). The wireless communication interface comprises an antenna, radiofrequency electronics, and signal processing electronics. The platform also comprises a wired or wireless network interface 530 configured to communicate with other nodes of the wireless communication network. The platform also comprises a packet handler 520 which operates on received packets to perform various tasks such as but not necessarily limited to packet encapsulation/decapsulation. In some embodiments, the packet handler 520 comprises a microprocessor 550 operatively coupled to memory 540. The microprocessor 550 executes program instructions stored in the memory 540 in order to perform the tasks of the packet handler 520. The memory may comprise one or several types of memory, and in general holds program instructions 542, lookup tables 544, RA node configuration information 546, and packets in a packet buffer 548.

In various embodiments, rather than specifying the particular protocol the RA node will use, a format is provided according to which the RA node should express the data. The expression may include encapsulation or decapsulation. The provided format is sufficiently flexible to allow for several different encapsulation/decapsulation operations to be performed. Rather than specifying the protocol, the information being transmitted is specified.

The RA node receives a packet, consults a template defined according to configuration information, and performs operations specified by the template. The template may be pre-compiled into lower-layer actions to be executed by the RA node. In one embodiment, the template may comprise or specify executable code embodying the lower-layer actions.

In an embodiment, a template may have two portions. The first portion corresponds to initialization and is performed upon creation of a new packet flow. The initialization portion is called at protocol setup time. Higher-layer signaling may map multiple flows to the same template. A new packet flow may be tied to the creation of a new radio bearer, the reception of a packet which has markings not previously seen or not on record (e.g. indicative of the first packet to a new IP destination), or the reception of a session request message in the control plane.

As used herein, the term "bytestream" refers to a series of binary values which may be accessible to the encapsulation/decapsulation method and apparatus. Multiple bytestreams can be present, and there may be a large number of bytestreams. For example, each possible data field (UE_id, QoS, QCI, etc.) may be associated with a different bytestream. The terms bytestream and bitstream are used interchangeably herein, and byte alignment is not necessarily required in a bytestream. A bytestream can be referred to (e.g. in the template) via various methods, for example as described below with respect to the term 'identifier'.

As used herein, the term "table" refers to a set of key/value pairs, which may be accessed using longest match or exact match semantics. There may be several tables available. A table may be referred to by a string, or by a bytestream or bitstream. The keys of the table may be bytesteams (possibly of size one). Tables may be read-only, or read-write.

As used herein, a "field" refers to a data structure containing three pieces of information, namely "type", "offset" and "length" information. The "type" is formatted as an identifier and describes which bytefield to refer to. As used herein, a bitfield or bytefield, also referred to as bitstring or bytestring, refers to a series of bits or bytes. The "offset" may be an integer and refers to a number, in bits or bytes, from the beginning of the referenced bytestream. The "length" may also be an integer and refers to a number, in bits or bytes, of the bytestream being referred to (beginning at the "offset"). Fields may also be expressed as payloads directly.

In one embodiment, there are a limited number of bytefields, for example two bytefields. The two bytefields may refer to: to the packet itself, and information contained within the template itself. This approach allows for various protocols to be enabled by essentially prepending complete headers to the beginning of a data payload.

Another embodiment allows for a scoped set of bytefields corresponding to particular traffic. These bytefields may be referred to by a numerical correspondence (an identifier). Examples of these bytefields are given in Table 1 below.

TABLE 1

Examples of bytefields

| Identifier | Description |
| --- | --- |
| 0000 | the packet to be encapsulated |
| 0001 | A bytestream provided in the template |
| 0010 | UE-specific information in the RA node (eNodeB), e.g. device ID, CQI info, RLC fields etc. |
| 0011 | General information in the RA node, e.g. BS id, BS IP header etc. |
| 0100 | Meta Data: A scratch pad of memory which will disappear after the processing of this packet |

In a further embodiment, the identifier refers to data in a URL like format. For example, identifiers may take the general form: "This_UE\RLC_sequence_ID", "This_packet\TTI_of_first_transmission", or "This_Node\Loading". The identifiers can therefore include separate fields indicative of different information.

In some embodiments, the scoping may be dynamic as well as fixed. For example, the identifier may be referenced using a field format. In dynamic scoping, the selection of the identifier is in some way dependent on the payload within a particular packet (i.e. it is not hard coded in the template at this operation). In fixed scoping, the template uses a fixed mapping to an identifier. This may be beneficial in that the references can be precalculated and most or even all of the processing can be done before the reception of the particular packet. In the template, the identifier may be referred to by the field format (loading data from some metadata). In this case, care should be taken to have the format (binary representation, string representation), aligned for different fields. Both string and binary options may be allowed, for example both "This_UE\RLC_sequence_ID\String" and "This_UE\RLC_sequence_ID\binary" may be allowed.

A set of commands for use in some embodiments of the present invention will now be briefly described. These commands are presented as illustrative examples and not necessarily required in the specific forms presented below. These examples of commands include: "write fields"; "match field"; "goto template"; and "perform operation". "Write fields" can be used to copy data from one place to the next. "Match field" can be used as a fundamental conditional, as based on the match value different operations can be performed. "Goto template" can be used to allow recursive declarations, for example to direct the RA node to use a particular template for generating IP traffic. "Perform operation" can be used for performing operations required in various protocols, such as but not necessarily limited to cyclic redundancy check (CRC) calculations, time-to-live decrements and sequence number increments.

The "write field" command instructs the RA node to copy, as part of the encapsulation operation, data from a designated from_field, to a designated to_field. Examples of the format of this command are given in Table 2:

TABLE 2

"write field" command format

| Parameter | Format | Description |
| --- | --- | --- |
| From_field | Field | Source of data |
| To_field | Field | Destination for data |
| Method | Write option: overwrite or insert | Specifies whether operation overwrites existing information or inserts the new information without overwrite. |

In some embodiments, preprocessing of templates would allow for efficient inserts as the "write field" command has fixed-width semantics.

The "match field" command allows for table lookup operations to be accessible for use in the encapsulation operation. This command can be used to map one set of fields to one or more other sets of fields, for instance mapping QoS fields to CQI fields. This allows for efficient multiplexing of data between different templates. Examples of the format of this command are given in Table 3:

TABLE 3

"match field" command format

| Parameter | Format | Description |
| --- | --- | --- |
| From_field | Field | Source of data |
| To_field | Field | Destination of data (the type field may be in meta data) |
| Method | Longest match Exact match | Which lookup method to use |
| Default | Bytestream | If exact match is used, which solution is returned if no results are found. |
| Table_identifier | Identifier | |

The "goto template" command instructs the current template to refer to a different template at the point of the command. This command can be used as a conditional statement (i.e. using fields and table lookups to access different templates), or for ease of readability and/or lower overhead of signaling. Examples of the format of this command are given in Table 4:

TABLE 4

"goto template" command format

| Parameter | Format | Description |
| --- | --- | --- |
| Template id | Identifier | Which template to use, note that the identifier may come from a field reference |
| Offset | | |

The "apply operation" command provides an instruction to apply a particular specified operation, such as CRC calculations, bitwise additions or subtractions (e.g. to increment or decrement counter fields). For protocols with non-contiguous fields and/or pseudo-headers, for instance, such operations may require multiple calculations.

An example embodiment of the present invention will now be described, in which a GTP-U tunnel is specified. An example of a GTP tunnel is specified according to Table 5:

TABLE 5

| GTP tunnel specification | | | | | | | | |
|---|---|---|---|---|---|---|---|---|
| + | 0-2 | 3 | 4 | 5 | 6 | 7 | 8-15 | 16-23 | 24-31 |
| 0 | Version | Protocol type | Reserved | Extension Header Flag | Sequence Number Flag | N-PDU Number Flag | Message Type | Message length | |
| 32 | | | | | TEID | | | | |
| 64 | | | | Sequence number | | | | N-PDU number | Next extension header type |

For a GTP-U tunnel, and for a particular Radio Bearer, all of the information in Table 5 is fixed except for the sequence number. The information in Table 5 would change for a different GTP-U tunnel, or a different Radio Bearer. Thus, the template for specifying the GTP-U tunnel may be given by the following pseudo-code:

```
GTP-U.template
Initialize( ) {
    WriteField({UE\meta, 0,32},0, overwrite) // initialize sequence number to zero
}
    WriteField({template_payload, 0, 64},{PDU, 0,64}, insert) // copies over baseline fields
    WriteField({PDU\length, 0,16},{PDU, 16,16}, overwrite) // adds length field
    WriteField({UE\ID, 0,32},{PDU, 32,32}, overwrite) // adds tunnel id (same as ueid)
    // update calculate sequence number
    ApplyOperation(Add, {UE\meta, 0,32}, 1)
    WriteField{UE\meta, 0,32},{PDU, 32,24}, overwrite) // copy sequence number
```

Embodiments of the present invention may be implemented similarly to the protocol independent forwarding implementation referred to as "P4", but with additional metadata fields added. The additional metadata fields are configured to carry information regarding the mobile device (UE) being served, the RA node, and the packet being handled by the RA node. This information and an indication of what is available to be referenced by the template may be indicated in a header file in some embodiments, and/or may be provided intrinsically for use by a compiler acting for the RA node. Examples of fields which are available to be referenced by the template are given in Table 6 (below).

Thus, embodiments of the present invention provide in particular for the creation and use of particular header fields. The scope of the associated metadata used in the header fields may be dynamic.

Table 6 provides a list of examples of the type of information that may be made available for external transmission and/or processing, according to example embodiments of the present invention.

TABLE 6

| Example field information | |
|---|---|
| Field | Description |
| RLC.x | All RLC state fields as defined in the 3GPP standard. |

TABLE 6-continued

| Example field information | |
|---|---|
| Field | Description |
| | This includes the data sent for this information, as well as the state associated with the RLC layer. RLC sequence number |

TABLE 6-continued

| Example field information | |
|---|---|
| Field | Description |
| PDCP | All PDCP fields (as above) i.e. PDCP SN |
| Time_of_first_transmission | The first time that the HARQ process associated with this data was transmitted. This may be encoded as the SFN and TTI index from the beginning of the frame, or using similar encodings. |
| Retransmission_number | How many times the data was retransmitted. |
| Radio bearer | LCID, or nonce associated with session request, etc. |
| Lower layer channels | Semi-static grant information. |
| RoHC information | What channel, what CRC values, etc. |
| PHY layer CRC mapping | (used in invisible, if transmission pseudo headers are) |

TABLE 6-continued

Example field information

| Field | Description |
|---|---|
| Any field defined for RRC signaling from the UE or eNodeB) (perhaps reference by signal type, and IE field) | |
| PDCCH fields | Any field currently defined in the PDCCH (e.g. in association with POF/P4 control channels, e.g. PDCCH, PUCCH). |
| Bytestreams configured by RRC signaling | Bytestream that the UE receives by RRC signaling. |
| PUCCH fields | CQI, PMI, PMI w.r.t. DMRS combinations (i.e. What is the PMI/CQI for sequences a, b, and c) |
| Cell Loading | Send more data, send less etc. |

In some embodiments, the configuration information may include commands and details formatted using the abstract syntax notation one (ASN.1) or a similar notation. ASN.1 may be used to specify an interface, which is provided to the RA node at session startup. In one embodiment, at session startup, default parameters, HASHing, and/or other compression-type schemes may be used to initialize variables in a deterministic manner.

The RA node then applies the encoding using the ASN.1 fields. The fields may be provided (made aware) to a third party, for example through standardization or external signaling.

Some modifications to the ASN.1 encoding scheme may be provided to ensure the definition of arbitrary fields (e.g. fixed strings etc.). Extensions to ASN.1 such as those described in "Using ASN.1 to describe 3GPP Layer 3 Message Formats," by Objective Systems, Inc., July 2012 and available at: htpp://www.obj-sys.com/docs/UsingASNtoDescribe3GPPMessages.pdf may be used to allow flexibility.

Accordingly, in one embodiment, the RA Node/encoder receives the following:

```
IP_header =::= SEQUENCE {
    version         INTEGER(0..15),
    iHL             INTEGER(0..15),
    tOS             INTEGER(0..255),
        total-Length INTEGER(0..2^16–1),
    ...
```

In the above, the fields for version, iHL etc. are either: specified along with the ASN.1 format (i.e. fixed); allowed up to implementation by the end node (i.e. source address is left to the RAN); or referenced to configuration messages sent to the node, either previously or in the future.

Embodiments of the present invention comprise exporting information from the RA node into other entities. This is performed by using the template to copy information from the provided information (Table 6) into the packet.

Embodiments of the present invention comprise reducing the load/complexity of egress nodes. This is performed by explicitly removing any optional support that may be required if full protocols were to be supported.

In various embodiments, when a payload which is unrecognized for decapsulation occurs, an error message can be generated. The error message can be provided in a bytestream configuration.

In various embodiments, the above solutions are used to modify variables within existing protocol layers rather than add new protocol layers. For example, the region of a packet containing the source IP address may be overwritten by information contained within the template. Similarly, the region of a packet containing a destination IP address may be overwritten by information contained within the template. In this fashion packets may be modified for transport based upon network rules, rather than based upon the packet protocol selected by the end device that generated the packet.

Embodiments of the present invention may be applied at one of several protocol layers. As part of the encapsulation/decapsulation, the next protocol field in the underlying transport layer (e.g. Ethernet) may be set. An adaptive layer may be provided, such that if a RA node supports several protocols (e.g. IP, IPv6, Ethernet, GTP-U, TCP), then commands are provided for inserting various protocol layers between parameters.

In some embodiments the Next Header in IP or EtherType in Ethernet, or equivalent, is provided so that the protocol carrying this packet can mark it accordingly.

Further details of embodiments of the present invention will now be provided.

Figure 6A:
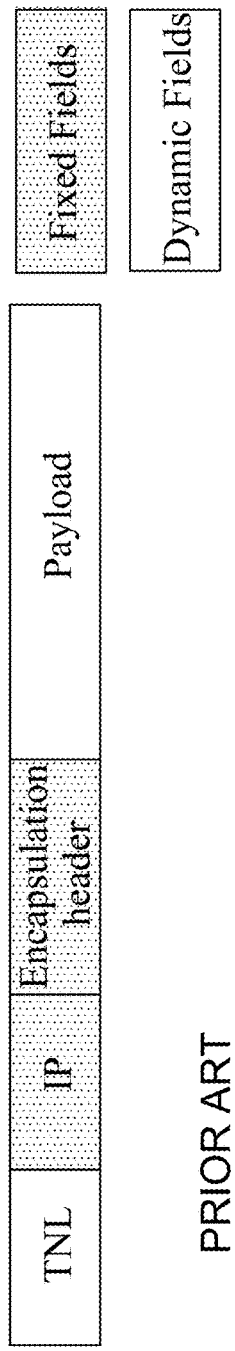
FIG. 6A illustrates a general version of a packet formatted according to a generic encapsulation.
Figure 6B:
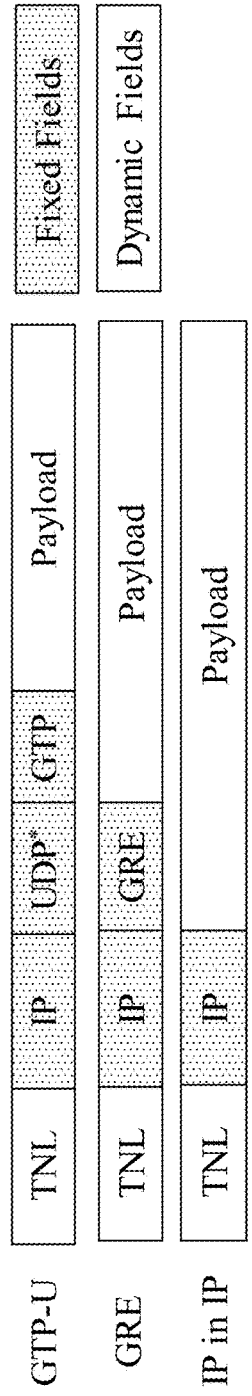
FIG. 6B illustrates examples of several concrete encapsulation protocols in use.

FIGS. 6A and 6B illustrate example header layouts. FIG. 6A illustrates a general version of a packet formatted according to a generic encapsulation. The packet includes a TNL header, an IP header, one or more encapsulation headers, and a payload. The IP header and encapsulation headers can be considered to be fixed, while the TNL header and payload can be considered to be dynamic, for example variable from packet to packet.

FIG. 6B illustrates examples of several concrete encapsulation protocols in use according to the prior art. FIG. 6B illustrates components which can be considered fixed, within a particular PDU session, as shaded portions, and components which can be considered to be dynamic. FIG. 6B shows particular instances of the general case of FIG. 6A, so that, for example the encapsulation headers include a UDP and GTP header, or a GRE header.

Figure 7:
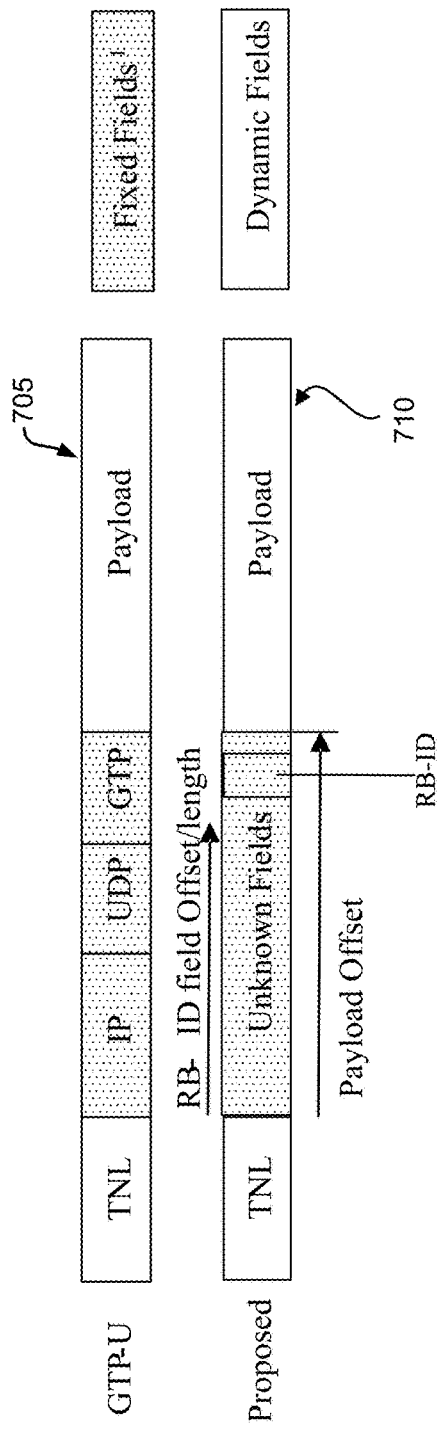
FIG. 7 illustrates handling of a packet according to an embodiment of the present invention.

FIG. 7 illustrates a comparison between prior art handling of a prior art packet 705 (top) and handling of a similar packet 710 according to an embodiment of the present invention (bottom), in support of protocol decapsulation. The packet 710 represents an example of a GTP-U tunnel packet to be processed by the RA node for radio bearer (RB) selection. According to the present invention, the RA node is configured to read a portion of the packet 710 starting at a location given by an RB-ID offset value, which is configured to the location of the TEID. In this example, the RA node is configured to read 32 bits of the packet 710 starting at this location. The length parameter of 32 bits is specified by a length parameter. As will be appreciated, the length of 32 bits is by way of example only, and not intended to be limiting.

The RA node is further configured to read another portion of the packet 710 starting at a location given by a payload offset value, which is provided to the RA node. This location falls at the end of the GTP header and the beginning of the payload. In various embodiments, no additional processing is required on the UP fields. For more advanced features, such as in order delivery during handover, or proposed QoS labeling, the RA node may be configured to read and process additional fields of the packet 710. However, a significant class of traffic has no requirements for these features, and hence no need for the RA node to understand the packet protocol for definitions of those additional fields. As illustrated, fields of the packet are unknown to the RA node, whereas in prior art handling the RA node would have a mapping for each of the fields in the packet 705.

Figure 8:
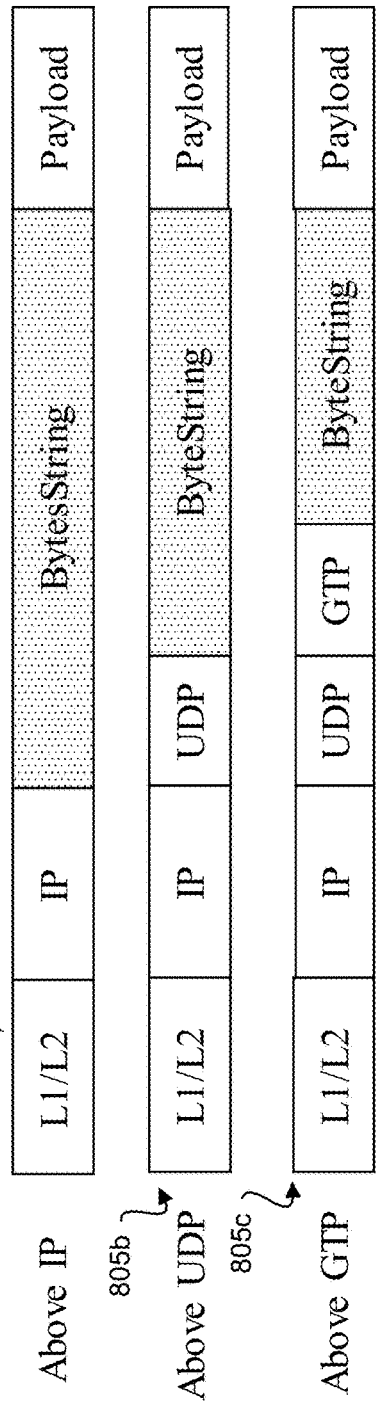
FIG. 8 illustrates treatment of encapsulation headers in accordance with embodiments of the present invention.

FIG. 8 illustrates various different embodiments of the present invention, in which the encapsulation header which is treated and processed by the RA node as a bytestring can encompass different portions of the packet's encapsulation headers. This relates to per-QoS-class tunnel protocols. The location of the beginning of the bytestring can be specified in the RA node's configuration information. This allows different portions of the encapsulation header to be treated as dynamic, and other portions to be treated as static and for processing as a bytestring.

The configuration of FIG. 8 describes how the template can be applied at different protocol layers. The application of template based processing may be applied to generate encapsulation headers at several layers. In FIG. 8, three examples of packet handling 805*a*, 805*b*, 805*c* are given, each illustrating the processing/template being applied starting at different levels in the protocol stack. In these examples, the control plane is configured to provision the encapsulation header as a single arbitrary bytestring. More advanced features can be adopted by changing the offset length, and the corresponding length of the bytestring. This bytestring may be read by an underlying TNL or by a SFC along the path traversed by the packet. The exact format of this bytestring may be beyond the scope of current 3GPP standards. The placement of the bytestring may be configured on a per user plane (UP) basis. According to this approach, transparent support of various different TNL and SFC formats may be provided.

A template for performing encapsulation/decapsulation may also indicate mappings to protocol layers. For example, the template may indicate the bottom layer is IP, TCP. Additional templates may be provided for particular IP and Port number combinations.

In some embodiments, the IP header in a packet is considered to be part of the byte-stream. As such, the encapsulation header includes the IP header. An advantage of this configuration is that it provides for independence on IP as next hop, thus Ethernet multiprotocol label switching (MPLS) may be provided.

According to some embodiments of the present invention, a RA node in receipt of a packet may be configured to strip away components of underlying layers, and/or forward traffic, based on parameters of configurable protocols. This can be done by additionally configuring a tunnel endpoint to read the packet's tunnel encapsulation header from a particular location in the packet, specified to the RA node. This location can be expressed as an offset, and length from a known position of an underlying protocol. Additionally, the location of the payload can also be configured.

Figure 9:
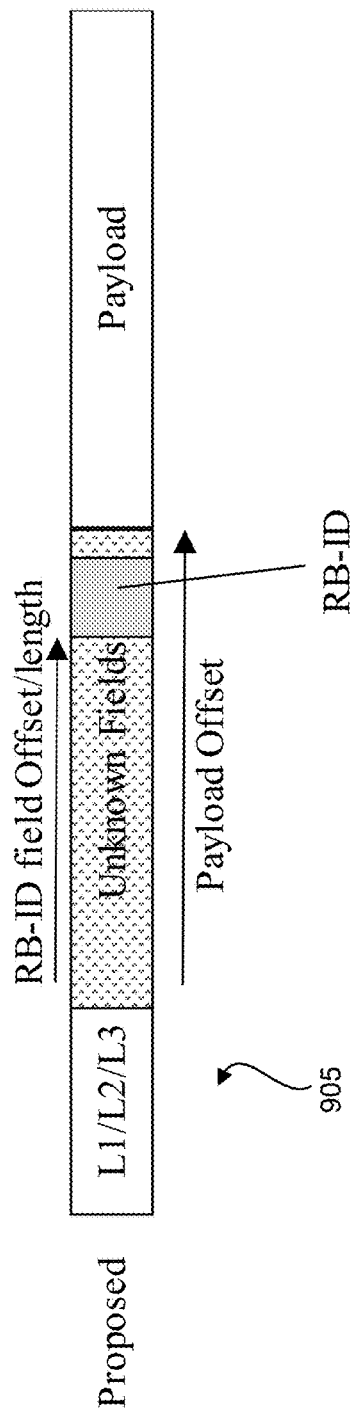
FIG. 9 illustrates the location of a radio bearer identifier (RB-ID) within a fixed bytestream of a packet, in accordance with embodiments of the present invention.

In support of the above, FIG. 9 illustrates the location of a RB-ID locatable within a fixed bytestream of a packet 905. As indicated, the bytestream also includes unknown fields which do not necessarily need to be read or interpreted by the RA node. The location of the RB-ID may be specified implicitly or explicitly by the configuration information provided to the RA node by length and offset parameters which indicate a bit/byte offset from a reference point in the packet 905. For instance, the reference point may comprise an offset value indicative of a first edge (i.e. offset location) of a portion of the packet 905 from an initial bit/byte of the packet 905. A length value indicative of a portion length terminating at a second edge of the portion of the packet 905, indicating a number of bits/bytes form the first edge (i.e. offset location) of the packet 905. The location of the payload can be similarly specified by a payload offset parameter indicating a length/offset from a reference point in the packet 905 to the start of the payload bits. In some embodiments, the RB-ID may be a TEID, for example a virtual or non-virtual TEID.

Embodiments of the present invention allow for the core network (CN) to configure a RA node (e.g. eNodeB or gNodeB) to generate the next-generation user plane (NG-U) PDU's using a template-based configuration. This configuration may be received as a template as part of a radio bearer configuration message. The template contains instructions on how to generate the NG-U PDU. One such instruction is to append a particular bytestring contained in the template to the traffic carried over a particular radio bearer (or other stream made aware to the RA node). This instruction can allow the RA node to support a subset of a variety of stateless protocols commonly used for mobility including IPv6, GTP, GRE, IP in IP, as well as several protocols used in service function chaining such as the network service header (NSH). The bytestring can be configured to be applied at different protocol levels.

Figure 10:
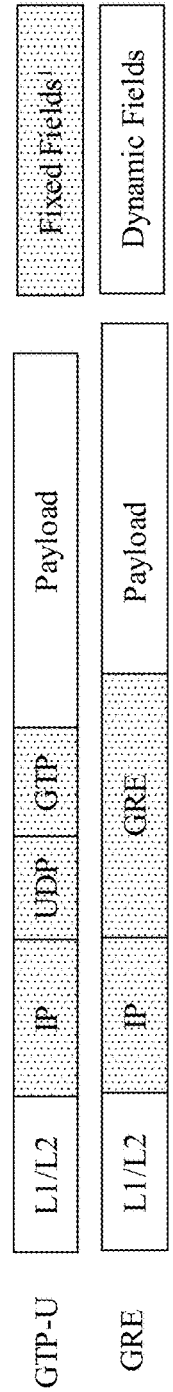
FIG. 10 illustrates example header layouts that can be handled by embodiments of the present invention

FIG. 10 illustrates example header layouts that can be handled by embodiments of the present invention, in relation to the present discussion by providing suitable offset/length parameters from a selected reference point to locate relevant information or fields within the packet structure.

Accordingly, by operation of various embodiments of the present invention, various different protocols can be emulated. This is achieved because, within a particular radio bearer, the fields of various encapsulation protocols are essentially fixed and can be considered to be fixed. In some embodiments, there may be one or more optional dynamic fields, such as the CRC field of a packet. In some embodiments, these dynamic fields are unused. In other embodiments, suitable support can be provided within the template format for using same.

This configuration can allow operators to deploy custom and proprietary protocols on the backhaul. 3GPP or similar nodes of a network can provide at least some support for these protocols without being aware of what they are. This encourages a more fluid protocol usage, allows transparent interoperability, and allows for a competitive ecosystem of products.

Embodiments of the present invention may be implemented when additional packet processing is performed within the network. Such processing may include processing via service function chains (SFCs). These SFCs perform deep packet inspection (DPI) on user traffic to perform the appropriate classification, and then append the needed header. When classification is equivalent to what is done on a per-radio-bearer level, then this header can be appended by the RA node (gNodeB, serving gateway, packet gateway, mobility anchor (MA) or other 3GPP node) with limited overhead. As there is currently no 'best' header for SFC support this approach provides 3GPP support for a future-proof design, rather than locking operators into a particular format.

Embodiments of the present invention apply protocol independent (oblivious/agnostic) encapsulation at different levels in the protocol stack, allowing for hardware accelerations at various stages (i.e. Ethernet/IP) as well as stateful operations where needed. This solution may be used for non-IP traffic, where such encapsulation may allow for appropriate forwarding and treatment of the non-IP traffic beyond or within the 3GPP data plane.

FIG. 8, which has also been described, also illustrates examples of encapsulation at different levels in the protocol stack.

In various embodiments, decapsulation is additionally or alternatively performed in a protocol-independent manner. Decapsulation can proceed according to a two-step process. In the first step, a mapping is defined between a particular field and the radio bearers. In the second step, the location of the encapsulated data is defined. It should be understood that in existing standards, to obtain similar results, the RA nodes must be designed to understand the protocol of the packets that they handle. An RA node will have to perform protocol specific processing on each layer of an encapsulated packets to obtain information, which makes configuration of the node more complex and results in a slower processing time. Embodiments of the present invention support the generalization of messages used for performing the above (e.g. messages and actions performed by the RA node and core network). This allows for the same approach to be used on other, possibly non-3GPP protocols.

In various embodiments, the template may only specify the location of the different fields. These different fields are then compared to a database (FIB) for determining the different hops. This database can be indicated through separate control signaling. For instance, through Modify Bearer Request messages.

The RB-ID can be located using a pair of numbers representing an offset (distance in bits or bytes) from a particular reference location such as a protocol beginning, and a length. For instance, in a GTP-U tunnel, we assume the RB-ID is stored in the TEID field. Under a current GTP-U protocol, the TEID field is located a fixed offset of 96 bits from the underlying IP header (64 bits for UDP, then 32 bits for the first part of the GTP-U header), and has a length of 32 bits. Thus, the location of the TEID field may be defined by the {offset, length} pair {96, 32}. If the location of the RB-ID was the inner UE IP destination address, the {offset, length} pair would be {256, 32} for IPv4. This value can be obtained by counting 64 bits for UDP, another 64 bits for GTP-U (assuming no optional headers) and finally the IP destination is the 96 bits from the beginning in EP v4. For IPv6 the TED is 192 bits from the beginning of the PDU.

In various embodiments, as part of the bearer/session setup message, a RB-ID and field identifier is indicated to the RA node (e.g. a NodeB, an eNodeB, or a gNodeB). Using this information, the RA node may be configured to match incoming traffic to the appropriate radio bearer. Similar approaches can be used to determine other parameters such as QoS.

In some embodiments, an additional matching field may be provided. This field represents bit fields that the header is supposed to have. This matching field is used to prevent misconfigured traffic from entering a RB. For example, the matching field may be used to ensure that the fixed components in the expected protocol (i.e. UDP header in GTP-U, destination field in IP, or other expected fields) are what they are expected to be. As part of decapsulation, a field indicating a series of bytes in the incoming packet is indicated. This series of bytes are checked against another series of bytes, possibly provided in the template, as part of control signaling, or provided from function of the packet (i.e. a CRC function). If a match occurs then processing occurs as usual, with the data proceeding towards the UE/Network depending on direction. Otherwise the packet is dropped, logged or processed differently.

Following the above approach may result in a design and development situation requiring only a limited amount of standardization activity to support a large category of different internet protocols. This allows 3GPP nodes to be both flexible, and due to the limited amount of standardization, understandable (in the user plane).

In various embodiments, the tunnel (TNL) formats can be represented as simple formats. Furthermore, the choice of new TNL systems can be created without further standard or product changes. The formats can be partially or fully specified and configured using configuration information which is provided to a packet handling device such as a RA node. For example, a stack of MPLS labels can be prepended by the RA node.

Some embodiments of the present invention provide for the removal of data plane processing operations from within or immediately outside of the wireless communication network domain. Many SFC models presume a SFC classifier to be the first step. This classifier then appends service identifiers to the packets. The service identifier is then read by the following nodes. This identifier can be provided by the RA through appropriate template definition.

In some embodiments, memory and statefulness, such as are found in the advanced features of P4, can be used to enable more advanced protocols and operations of the present invention.

Figure 11:
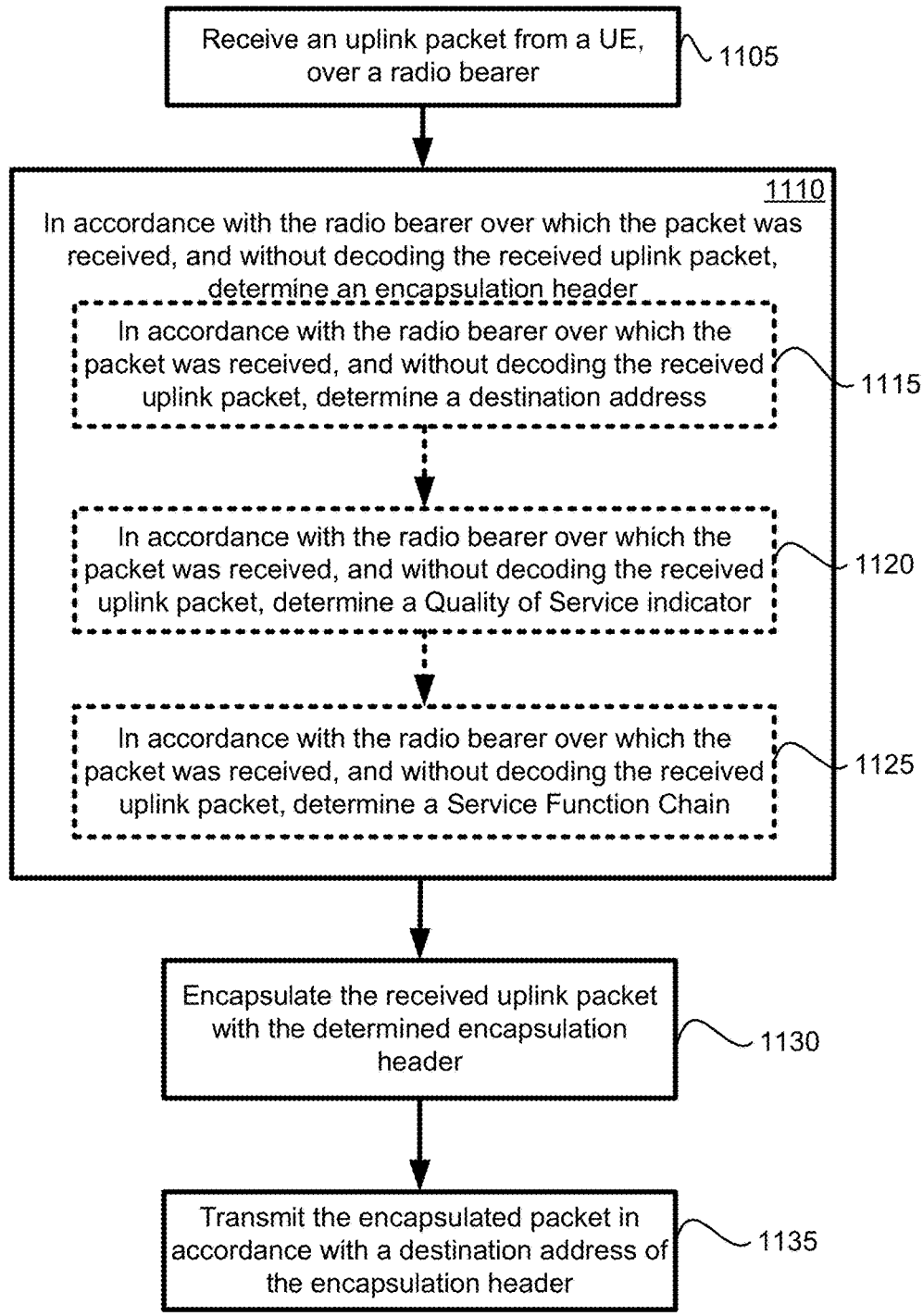
FIG. 11 illustrates a method of handling uplink packets at a Radio Access node.

FIG. 11 is a flowchart illustrating a method for execution at a RA node according to an embodiment of the present invention. The method starts in step 1105 with the receipt of an uplink packet from a UE, over a radio bearer. The RA node is able to identify the radio bearer over which the packet is received, and in this embodiment the radio bearer is used as identifying information to classify the received uplink packet.

In process 1110, the RA node, in accordance with the radio bearer over which the packet is received, determines an encapsulation header using stored information that is locally accessible to the RA node. As noted above, this stored information may take the form of a template, or a table used to store a plurality of different templates. This encapsulation header can include not only a destination address, but also information such as a QoS indicator and a Service Function Chain. Other information can also be included in the header as required. Because this information can be associated with a radio bearer, or in some embodiments with an identifier of the UE associated with the transmission, the received packet does not need to be decoded.

In optional step 1115, the RA node may further determine a destination address for the received uplink packet, the determination in accordance with the radio bearer over which the uplink packet was received, and without the RA node decoding the received packet. The destination address determined by the RA node may be different from a destination address contained in the received uplink packet. For instance, the destination address determined by the RA node may comprise a tunnel ingress node of a virtual network.

In optional step 1120, the RA node may further determine a Quality of Service indicator for the received uplink packet, the determination in accordance with the radio bearer over which the uplink packet was received, and without the RA node decoding the received packet. The Quality of Service indicator determined by the RA node may be different from a Quality of Service indicator contained in the received uplink packet (if any). The Quality of Service indicator may be used by the RA node to further process the received uplink packet or provide signaling to downstream nodes either by appending a Quality of Service indicator in the received uplink packet or through control signaling.

In optional step 1125, the RA node may further determine a Service Function Chain for the received uplink packet, the determination in accordance with the radio bearer over which the uplink packet was received, and without the RA node decoding the received packet.

In step 1130 the encapsulation header can be prepended to the received packet so that the packet received over the radio is encapsulated within a packet of a protocol specified by a configuration table. It should be noted that the RA node does not need to have any functional abilities with, or knowledge of, the original protocol with which the received uplink packet is encoded with upon receipt, or after encapsulation. After encapsulating the packet, in step 1135 the RA node can transmit the encapsulated packet towards its destination. This destination address can be included in the encapsulation header, as illustrated in the embodiment of FIG. 11.

Figure 12:
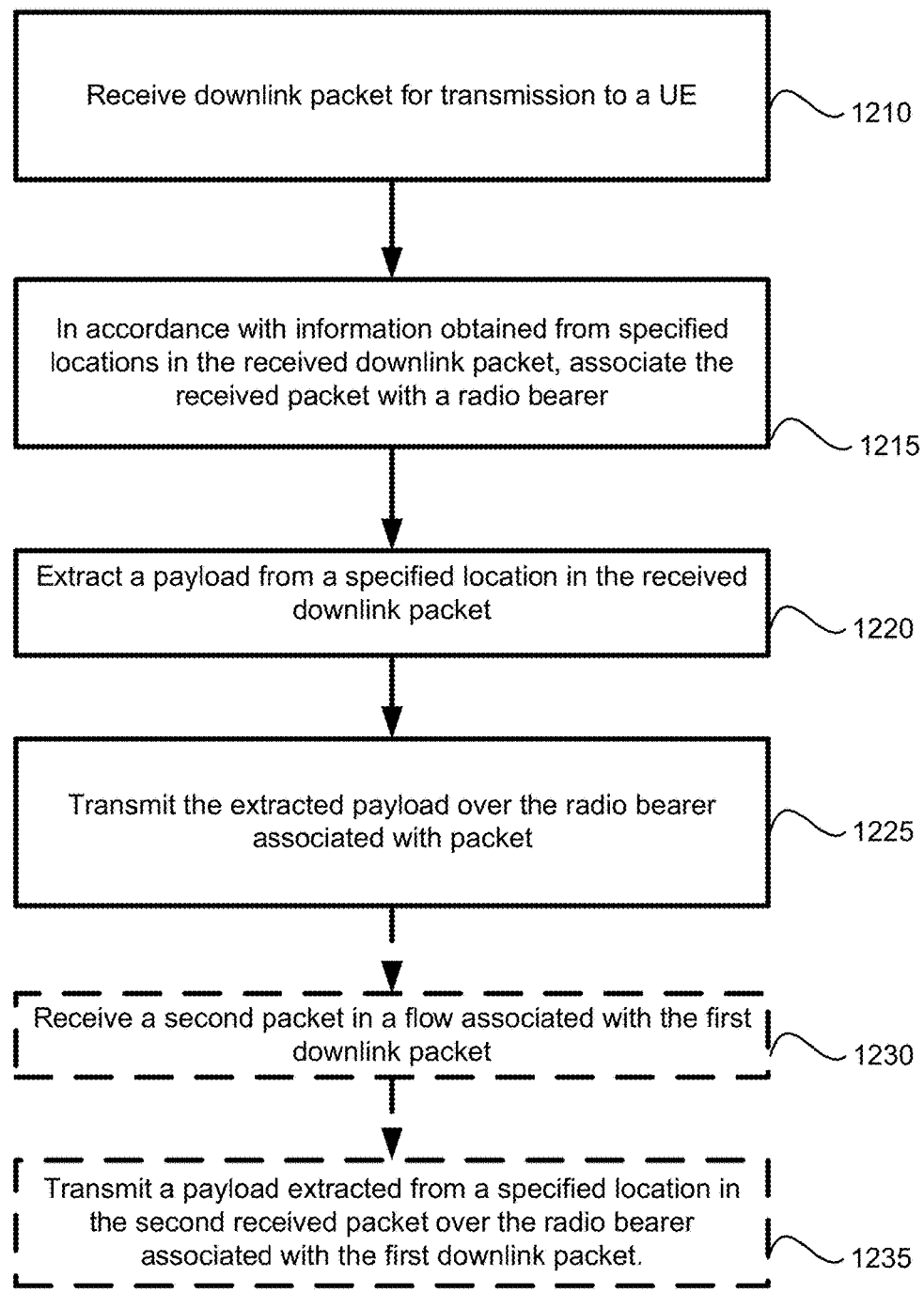
FIG. 12 illustrates a method of handling downlink packets at a Radio Access node.

In a downlink direction, an RA node can make use of a method such as that illustrated in FIG. 12. In step 1210 the RA node receives a downlink packet for transmission to a UE. At this point the downlink packet is encoded using a protocol, and may be encapsulated within a series of protocols. As illustrated in FIG. 8, each protocol that is used to encapsulate a packet typically will add a header on to the existing packet. This has the result of a packet payload being prefaced by a series of different headers. To avoid having the RA node decode a series of different protocols (or even a single protocol multiple times), the RA node can extract information from pre-specified locations in the received packet (treating the packet as a bitstream). Those skilled in the art will appreciate that there can be a series of contingent extraction operations, for example the RA node can look at a fixed location in the packet to determine which protocol, or which version of a protocol, is being used. This information would then govern where the RA node would next look for information.

In step 1215 an identifier of the UE to which the data is to be transmitted (or to the radio bearer to be used) is extracted. This may involve extracting a plurality of different data elements at specified locations, and using that information to determine a radio bearer associated with the received downlink packet by a lookup operation in a table locally accessible to the RA node.

In step 1220 a payload is then extracted from the received bitstream by extracting data from a specified location. The specified location may be determined, for instance, from an offset/length parameter measured from a reference point in the downlink packet. The offset/length parameter obtained by accessing configuration information based on the UE identifier (e.g. the radio bearer).

In step 1225 the extracted payload is then transmitted over the identified radio bearer toward the UE.

If the received packet is the first packet in a packet flow, the RA node can identify a subsequent packet as a packet in the same packet flow. In step 1230 a second subsequent downlink packet in a downlink flow associated with the first downlink packet is received by the RA node. In step 1235 the payload of the subsequent downlink packet can be extracted from a specified location in the second received downlink packet and sent to the radio bearer identified and associated with the first packet in the downlink flow.

Embodiments of the present invention provide for a particular way to describe and/or standardize the user plane protocol between 3GPP-defined nodes. Such embodiments are directed toward striking a balance between the current rigid structuring currently exemplified by GTP-U v1, and the free-for-all nature of the software defined user planes of PIF, PoF and/or P4, for instance. Further discussion of such embodiments is provided below.

PoE Overview

As used herein, protocol oblivious encapsulation (PoE) refers to a method in which the endpoints of a tunnel are configured to perform their operations in a manner which is independent of the structure of the encapsulation header. This approach is different from, but can be better understood in light of, Protocol independent forwarding (PIF) or Protocol Oblivious Forwarding (POF), as developed in the forwarding plane. In those approaches (PIF or POF) the intermediary nodes (e.g. routers) are configured to forward traffic in a manner which is independent of the protocol. A brief overview of these techniques can be found for example at http://www.poforwarding.org.

A PoE-enabled apparatus, such as a PoE sender (sending PoE entity), PoE receiver (receiving PoE entity), or PoE node, refers to a networked device (network node) which is configured to perform operations on packets to be transmitted and/or received packets, in accordance with embodiments of the present invention.

A notable difference between PoE and legacy proposals is that, rather than defining the protocol as a collection of both the actions taken and the location of the fields within the headers, PoE instead only defines the actions taken by the PoE entity and leaves the location of the fields (also known as parsing) to semi-static configuration. The semi-static configuration may be updated by providing updated configuration information to the PoE entity. This nominal difference may be used to improve the flexibility of the design.

In various embodiments, PoE attempts to strike a balance between the flexibility of a fully software-defined interface, with all the accompanying testing and interoperability issues, and the rigidness of inflexible interfaces.

Figure 13:
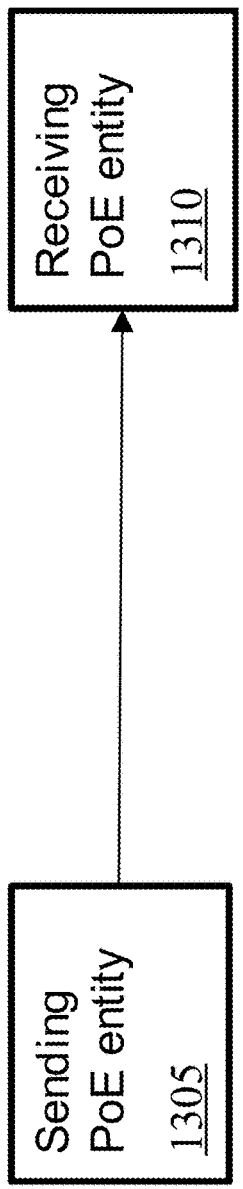
FIG. 13 illustrates aspects of a protocol oblivious encapsulation (PoE) tunnel, in accordance with an embodiment of the present invention.

As used herein, a PoE tunnel is the connection between two logical entities, using PoE, connected by a transport network layer, as illustrated in FIG. 13.

As used herein, a sending PoE entity ("PoE sender") 1305 refers to an entity which sends an encapsulated PDU into a PoE tunnel.

As used herein, a receiving PoE entity ("PoE receiver") 1310 refers to an entity which receives an encapsulated PDU over a PoE tunnel.

As used herein, a PDU Session Identifier (PDU-ID) is an identifier which unambiguously identifies a PDU session in the receiving PoE-U protocol entity for a given IP endpoint. The receiving side of a PoE tunnel receives this information over the control plane.

As used herein, a PoE-U tunnel is identified in each node with a PDU-ID, and an IP address. A PoE-U tunnel is necessary to enable forwarding packets between PoE-U entities.

As used herein, an IP path refers to a connection-less unidirectional or bidirectional path defined by two endpoints. An IP address defines an end-point. An IP path carries PoE messages between network nodes related to one or more PoE tunnels.

As used herein, a PoE Protocol Data Unit (PDU) refers to a PoE-U message, which may be either a P-PDU or a signaling message.

As used herein, a P-PDU refers to a user data packet (T-PDU) plus PoE-U header, sent between networked PoE nodes.

Conventionally, a protocol defines both the format of a header affixed to data payloads, and the actions that are carried out at protocol-compliant nodes. According to embodiments of the present invention, PoE allows for a standardized definition of the actions taken by the protocol, while allowing the locations of the protocol fields to be configurable over the control plane. Accordingly, PoE decouples the definitions of the actions from the data locations of the protocol fields on which the actions are to be applied. In this way, PoE senders 1305 and receivers 1310 can operate on data transmissions in formats that they are not specifically designed to decode. Thus, upon configuration, PoE nodes are fully operational.

TABLE 7

Configurability Comparison of PoE vs. GTP-U and P4/C/C++

|  | GTP-U | PoE | P4/C/C++ |
|---|---|---|---|
| Actions taken by protocol | Standardized | Standardized | Configurable |
| Protocol Field locations | Standardized | Configurable | Configurable |

Embodiments of the present invention lie in a middle ground between a full-fledged programmable backend (i.e. using a programming language such as P4 or C/C++) and the static designs of legacy protocols. Table 7 illustrates a comparison of configurability between such embodiments and comparable technologies, such as the GTP-U protocol and implementations programmed using languages such as P4, C or C++. By standardizing the actions taken, efficient implementations, guaranteed processing times, and some measure of interoperability (presuming compatible configurations) may be allowed for.

Examples of entries, or header components, which are left configurable under embodiments of the present invention include: field placement, features supported (e.g. usage of sequence numbers (SNs) and cyclic redundancy checks (CRCs)), and the embedding of data into headers, which allows a sender to append information which is PDU session specific, and which the sender is not necessarily required to be able to interpret. When noting that the sender is not necessarily required to be able to interpret information that it introduces into a header, it will be understood that a PoE sender 1305 may be provided, e.g. through its configuration, with information that it will always introduce into the header of data packets associated with, for example, a particular traffic flow. The PoE sender 1305 can enter this information into the header without necessarily having any need for it to understand or be able to decode, the packet or information.

In addition to allowing the sender to be able to introduce data into header fields that it is not necessarily able to decode, embodiments of the present invention allow different PoE receivers 1310 to act differently in response to different received packets from the same PoE sender 1305 (and can also allow a single PoE receiver 1310 to act differently in response to packets received by different senders). As such, the interpretation of the data in the received PDU may be configurable. When a PoE receiver 1310 receives a PDU, the manner in which a bitstream will be interpreted may vary based on the packet flow, and it can vary from the manner in which it would be interpreted by another PoE receiver 1310. Thus, a PoE receiver 1310 may identify packets from one of a first and second data flow. Particular segments of the headers of packets in the first and second data flows can be interpreted differently by the same PoE receiver 1310 based on knowledge that the encoding would be different for each of the data flows. Embodiments of the present invention can allow for an increase in interoperability between nodes by reducing transactional difficulties between nodes using different protocols, may allow for the transparent support of new features, and aid in the smooth support of new features, and interactions with legacy systems.

The behavior of PoE nodes, according to embodiments of the present invention, will now be described at a high level. In some embodiments, PoE nodes can be configured to support all the behavior that GTP-U does. Such embodiments of PoE nodes may thus be used to supplant GTP-U. In such embodiments, a PoE sender 1305 may be required to support the following capabilities:
1) Encapsulate a PDU, with appropriate markings
2) Encapsulate a PDU, and append a Sequence Number
3) Send an End Marker
4) Respond to an Echo Request
5) Send an error message These five actions correspond to five different functions that an embodiment of the PoE sender 1305 offers. Standards, such as 3GPP standards, may define when to call each particular function. The capabilities of responding to an echo request and sending an error message are defined, for example, in the GTP-U standard, for example as specified in the 3GPP standards document entitled "3rd Generation Partnership Project; Technical Specification Group Core Network and Terminals; General Packet Radio System (GPRS) Tunnelling Protocol User Plane (GTPv1-U) (Release 13)", 3GPP TS 29.281, V13.2.0, June 2016.

Continuing with the above embodiments, and without necessarily limiting the invention as a whole, in related embodiments a PoE receiver 1310 may be required to support the following capabilities:
1) Decapsulate a PDU, determine correct PDU session, and quality of service (QoS) markings
2) Decapsulate a PDU, determine correct PDU session, QoS markings, and SN markings
3) Receive an end marker
4) Detect an Echo Request
5) Receive an error message/Detect errors These five actions correspond to five different outputs that an embodiment of the PoE receiver 1310 can have. The actions taken after receiving these outputs are also defined in standards, such as 3GPP standards. Details regarding how each of the above features can be supported are discussed below.

According to embodiments of the present invention, the following information can be obtained as specified in the related standards (e.g. the 3GPP standards as cited herein):
  interaction with 3GPP nodes (e.g. handovers, etc.); logic for encapsulation;
  what steps are taken to encapsulate/decapsulate a PDU;
  logic for indication of 'special packets';
  end markers;
  echo requests;
  echo responses;
  error reporting;
  how and where to report errors/misconfigurations;
  control plane interaction; and
  configuration of fields.

PoE Receiver

A possible set of behaviors for a receiving PoE entity ("PoE receiver") 1310 when receiving a packet at the end of a tunnel is discussed below. For purposes of clarity, it is assumed that the nodes implementing PoE support a single branching point in the parsing logic. This balances adaptability with implementation complexity. A branching point in parsing logic essentially means that there is only a single place which can change the format of the encapsulation header. That is, if there are conditional elements (e.g. the presence of a sequence number), the presence of those conditional elements cannot be located inside of other conditional elements. It is noted that other embodiments may include multiple branching points in the parsing logic, which may increase flexibility and complexity of the technology.

A PoE receiver 1310 may perform the following operations: interaction with TNL; format determination; and data parsing.

A PoE receiver 1310 interacts with the TNL in order to receive PDUs. This is done by binding itself to the TNL using the parameters configured over the control plane. These parameters may include: source/destination IP address(es); a next header field; and other layer parameters. For source/destination IP addresses, a particular PoE receiver 1310 may be tied to one or more IP addresses. It may be 'link specific' (i.e. both source and destination). The PoE and the behavior of the node implementing same may be tied to one or more 'next header' fields as found in IPv4 or IPv6). Optionally, other layers' UDP/TCP can be configured as intermediaries. In this case, additional parameters (e.g. port number) may be assigned as necessary.

Figure 14:
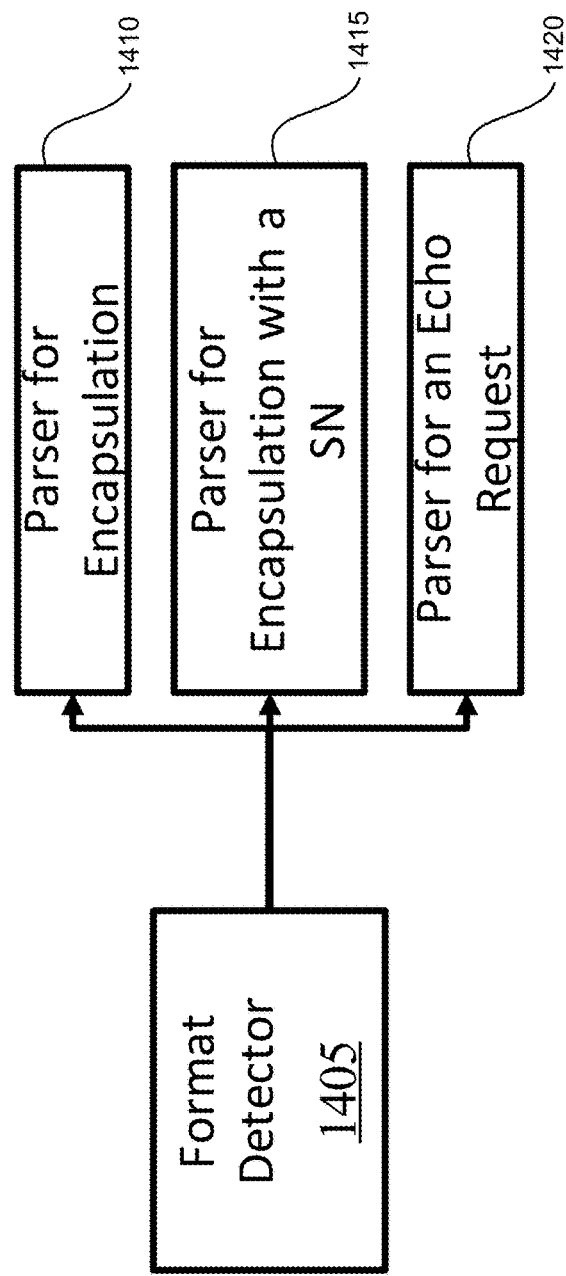
FIG. 14 illustrates a protocol data unit parser, in accordance with an embodiment of the present invention.

FIG. 14 illustrates PDU parser logic according to an embodiment of the present invention. A format detector 1405 is configured to parse the encapsulation header. The format detector 1405 may include separate parsing functionality, including for instance, an encapsulation parser 1410 for parsing the encapsulation header, an SN parser 1415 for parsing encapsulation with a SN, and a request parser 1420 for parsing the encapsulation header to detect an echo request. As will be appreciated, additional parser functionality may be provided as required to parse the encapsulation header depending upon the configuration.

The parsing logic of a PoE node can have a branching point that is associated with a location within the PDU, and a series of bit fields called format indicators. Upon reaching the defined location within the PDU, the PoE node's parsing logic can be used to identify which of the format indicators is present. The identified format indicator can be indicative of a correspondence between bit fields and formats/parsers. For instance, to parse GTP-U, the format field may be designated as the first 16 bits of the header (the optional flags, and message type section in a GTP-U header). The bit fields would then be 0x30ff, and 0x32ff corresponding to the two values indicating SN presence or absence.

Over the Next Generation Control plane (NG-C)/Next Generation Management (NG-M) plane interfaces, the PoE entity may have the parameters listed in Table 8 configured. These parameters are divided into two categories, namely those parameters shared by all formats; and those parameters which are configured on a per format basis.

TABLE 8

| PoE Entity Configuration Parameters | | |
| --- | --- | --- |
| Field | Description | Example |
| IP Address | Address of the PoE entity | 1.1.1.1 |
| PoE Next Header | The header that the IP layer indicates PoE is using | 0x11 (UDP) |
| NG Sanity | An optional check which ensures that this PDU follows a valid format. | 2123, loc (16-31) |
| Format Field location | When multiple formats are configured this field indicates which format is used. | First 16 bits of GTP (i.e. version, protocol, extension header flag, Sequence number flag, message type). |

TABLE 8-continued

| PoE Entity Configuration Parameters | | |
| --- | --- | --- |
| Field | Description | Example |
| Format | A list of multiple formats supported and there parsing. | |
| Field Value | The value mapped in the format field location | 0x30ff (normal GTP-U header, no optional flags) |
| PDU Session Location | The location of the PDU session | 96-123 (TEID) |
| QoS indication Location | The location of the QoS indication. | 196-203 (DSCP in inner IP) |
| PDU location | The location of the inner PDU | 160-inf |
| SN location | The location of the SN if configured | Not present |

Referring to Table 8, the format field can be combined with the NG Sanity field, if desired.

Behavior of the PoE receiver 1310 according to some embodiments is described as follows.

First, as part of NG setup messaging, the next header field is provided, along with the IP address(es) associated with this interface. The node implementing PoE is configured to bind all traffic using the provided next header field and these IP addresses for further processing by the PoE entity.

Furthermore, if configured, the NG Sanity check operation is performed. In this case, the fields associated with NG Sanity are compared with the incoming PDU. If a match is determined, then processing proceeds. Otherwise an error case is invoked.

The next step is the format field step. The format field differentiates between different possible options of formats for the PoE header. There are a limited number of these, typically corresponding to different scenarios that are expected. The PoE entity searches for an exact match to a given value over the data in the format field location. If a match is found, the format/parser from that field is used. If no match is found, an error case is invoked.

The format found using the format field step can be used to parse the received PDU to identify the various fields contained in the received PDU. The identified fields are then passed to the PoE entity to process in a manner which is defined in a protocol which is being implemented using PoE.

In various embodiments, a format detector 1405 at the PoE receiver 1310 is configured to check the encapsulation header at a configured location to identify fields associated with each parser 1410, 1415, 1420. The parameters configured can include a format indicator location, indicative of a position (e.g. using a field length or offset) of the format indicator, and format indicator values, indicative of values of the format indicator which map to defined parsing configurations.

When an appropriate format has been determined, the PDU can be parsed. In some embodiments, each format can have an associated identifier at a specified location in the encapsulation header. The format detector can process each of the specified locations to read a range of bits from the PDU and identify the format. The fields which are present can depend on the format ID.

PoE Sender

The behavior of a node which is encapsulating a PDU using PoE (a PoE sender) will now be described. It is noted that there are several different ways to define the behavior of a PoE node. Several of these have similar behavior.

As discussed above, in various embodiments a PoE sender 1305 is configured to handle the following operations: encapsulate a PDU, with appropriate markings; encapsulate a PDU, and append a sequence number; send an end marker; respond to an echo request; and send an error message.

In the following, it is assumed that each of the above operations can be uniquely defined using a unique command that can be configured independently with respect to location and parameters. In practice, this full flexibility is not necessarily required in all implementations.

Similar to the case of the PoE receiver 1310, a format is defined below to be a collection of fields and their mapping to the encapsulation header.

The behavior of the PoE sender 1305 according to various embodiments is expressed as follows. First, command upper layers are determined. Second, relevant fields associated with that command are calculated. Third, these fields are mapped to the PoE header using the format associated with the command. The first two behaviours are comparable to those of GTP-U, while the third behaviour is different from GTP-U. It should be understood that the calculation of relevant fields, and the mapping, as well as other steps, may, in some embodiments, be performed by another entity, and the PoE sender 1305 will simply store pre-calculated values and externally derived mappings.

Several example embodiments of possibilities for defining the mapping(s) are described in further detail below.

The PoE header can be made up of several fields, which are combined together to form the PoE header. This may occur when the PoE entity sends additional fields such as a sequence number and/or error code, for instance. The combination of fields may be performed for example by concatenating the multiple fields together. However, it is noted that other optional methods of combining fields are also possible, such as mapping based on bit ranges (and precedence). The order of fields in the combination are indicated as part of the configuration, as described elsewhere herein.

Figure 15:
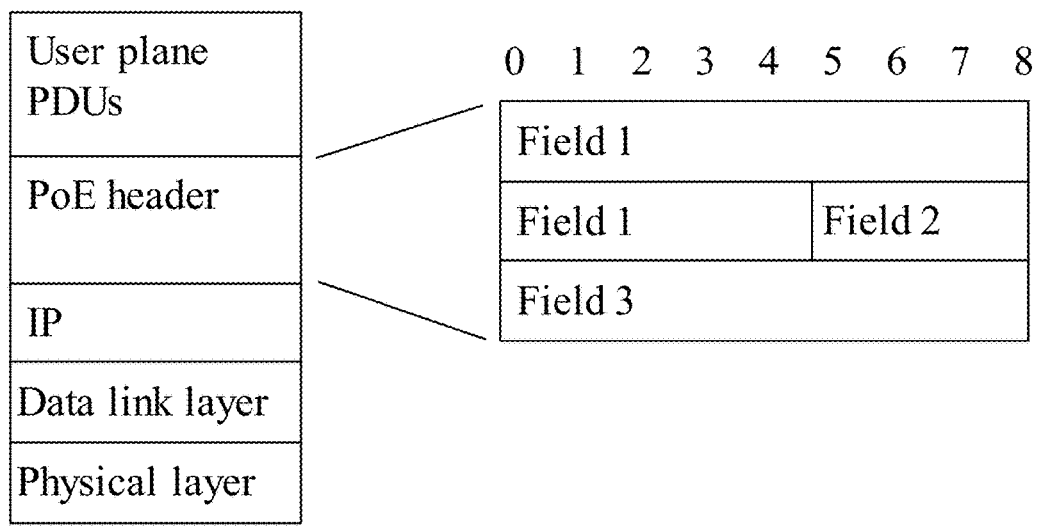
FIG. 15 illustrates a PoE header, in accordance with an embodiment of the present invention.

FIG. 15 illustrates fields in the PoE header, according to an embodiment of the present invention.

The values associated with each field are indicated in the same manner as they currently are within a protocol being implemented using PoE. That is, the values are a function of the PDU session and the current state of the communication link. Some fields may be a function of the interface, for example the fields may be shared by all PDU sessions (e.g. UDP port number). Some fields may be shared by all PDU sessions (e.g. PDU session ID). Some fields can be specific to particular QoS parameters.

The order of the various fields can be configured over the NG-C interface. This can be expressed as an explicit ordering, a prioritization, or as a Length value plus an Offset value. In various situations, there may only be a single field present for the entire command.

In some embodiments, the mapping of particular fields (i.e. the Format Indicator field) to the final header may be broken into portions using the mapping language. For example, the first bit may be mapped to a first location; the second bit may be mapped to a second location, etc. This may be used with any protocol, but may find more use with particular protocol such as GRE and GTP-U.

In various embodiments, each command is associated with a format which in some embodiments may contain the information listed in Table 9.

TABLE 9

Command Format Information

| Field name | Description |
| --- | --- |
| Fixed field(s) | 0 or more arbitrary Bitstrings, associated with this command |
| Fixed fields Location | The mapping of the Fixed fields to the PoE header |
| SN location | The mapping location of the SN. (a value indicative that the SN is not mapped may be supported) |
| PDU session location | |
| QoS indication location | |
| Length location | |
| TNL parameters | The TNL parameters associated with this command (IP address, next hop etc.) |
| Error indication location | |
| Payload location | Where to map the payload |

According to embodiments, the PoE sender 1305 can be configured to determine commands from upper layers. A node implementing PoE may be required to respond to commands from upper layers much as GTP-U and GRE are. The interface through which the upper layer commands are received may be designed to be in compliance with interfaces defined in the standards documents defining the different protocols supported (or supplanted) by a PoE implementation. Those skilled in the art will appreciate that such an interface design is optional, and it may be left to implementation outside of standardization. The following 'commands' are expected for preparing traffic for transmission through the NG-U interface: encapsulate a PDU, belonging to a PDU session; encapsulate a PDU, and append a sequence number; send an end marker; respond to an echo request; and send an error message.

NG-C Commands

The information which is configured over the next-generation control plane (NG-C) with respect to PoE configuration, according to some embodiments of the present invention, is described below.

One NG-C example of such a command is the NG-C setup request. As part of a NG-C setup request, the parameters associated with PoE can be configured. Examples of these parameters are given below in Tables 10 and 11 for PoE receivers 1310 and PoE senders 1305, respectively. It is noted that as NG-U is further developed new fields may be added, or old fields removed. The following provides an example solution, A potential manner in which the fields are used has already been described above.

TABLE 10

Configuration Parameters for PoE Receiver

| Field | Format | Description |
| --- | --- | --- |
| Node IP address | 32 or 128 bits | The IP address of the NG-U interface |
| NG Protocol | 8 bits | The protocol field as defined in IPv4, IPv6 |
| NG Sanity Check | Bitstring, Location | A bit string which is used to ensure this PDU is not garbage, or unintended for this processor. The location of this string is also configured. e.g. UDP port number 2123, location is (16-31) |
| Format Indication | Location | If multiple formats are supported dynamically (i.e. optional fields), indicate where the format is indicated |
| PDU-Session Location | Location per format | |
| QoS indication Location | Location per format | |

TABLE 10-continued

Configuration Parameters for PoE Receiver

| Field | Format | Description |
|---|---|---|
| Inner PDU Location | Location per format | Where the inner PDU (i.e. Payload) is |
| Sequence Number location | Location per format | |
| Length location | Location per format | |

It is noted that examples of location per format information will be described in more detail elsewhere herein.

Parameters for a PoE sender 1305 will be described below. In some embodiments, some or all of these parameters may be defined on a per PDU session basis. However, in other embodiments a less flexible definition regime may be used, for example with at least some parameters being defined in the next-generation user plane (NG-U) Setup Request. In the present description, some fields have been defined in both the NG-U Setup Request and the PDU session setup to indicate that they may be located in either (or both). If a parameter field is located in both the NG-U Setup Request and the PDU session setup, the per-PDU definition may take precedence.

TABLE 11

Configuration parameters for PoE Sender

| Field | Format | Description |
|---|---|---|
| Node IP address | 32 or 128 bits | The IP address of the NG-U interface |
| NG Protocol | 8 bits | The protocol field as defined in IPv4, IPv6 |
| Shared Fields | Bitstring, Location | A set of fields which can be referenced from multiple interfaces. These could be UDP ports, version number or other shared parameters. e.g. UDP port number 2123, location is (16-31) |
| PDU encapsulation | header | Bitstring | Header to append for PDU encapsulation |
| | Payload | Location | Location of Payload |
| PDU encapsulation With SN | header | Bitstring | Header to append for PDU encapsulation |
| | Payload | Location | Location of Payload |
| | SN loc | Location | Location to write SN to |
| End Marker | Header | Bitstring | The bitstring to send for an end marker |
| | PDU-ID loc | Location | Where to map PDU-ID for end markers |
| Echo Request | Header | Bitstring | The bitstring to send for an echo request |
| Send Error | Header | Bitstring | |
| | Error loc | Location | The location to insert the error fields associated with this error |
| | TNL params | TNL params | The TNL parameters to use when sending error messages. |

As part of PDU Session Setup the parameters listed in Table 12 are associated with the PDU session being established. Note that this can be done by associating PDU sessions with interfaces, devices or using other methods. Other options are also possible. The 'Encapsulation Header' field can be seen as a new field being added when compared to other control plane protocols.

TABLE 12

PDU Session Setup Parameters

| Field | Format | Description |
|---|---|---|
| PDU Session ID | 27 bits | The ID used by the control plane to refer to this PDU session. Also used by the receive entity to differentiate PDU sessions. |
| QoS Indication | 5 | A collection of QoSs that this PDU session will support. |
| Encapsulation Header | Variable length String(s) | An encapsulation header (possibly different for different QoSs) |
| Encapsulation Protocol field | 8 bits | As defined IPv4/v6 protocol field. |
| Received PoE Entity | 16 bits (or set of Multiple 16 bits) | Indicates which interface the PDU session ID will be valid over. |
| Transmit PoE Entity | 16 bits | Indicates which interface PDUs will be encapsulated from. This configures the IP address. (Conversely the TNL parameters may be expressed directly.) |

PoE Configuration to Interoperate with Other Protocols

In embodiments of the present invention, PoE may be used by a first device to facilitate interfacing with other devices that use existing protocols, without providing a full protocol stack to the first device. Configuration parameters for an example of a PoE receiver 1310 configured to interface with nodes using currently existing protocols are described below. Data locations are indicated using a range indicator, where (x-y) indicates the offset in bits from the end of the IP header, and 0 represents the first bit of the encapsulation header. For instance, a range of 12-15 indicates the 4 bits located at positions 12, 13, 14, and 15 bits into the encapsulation header.

Figure 16:
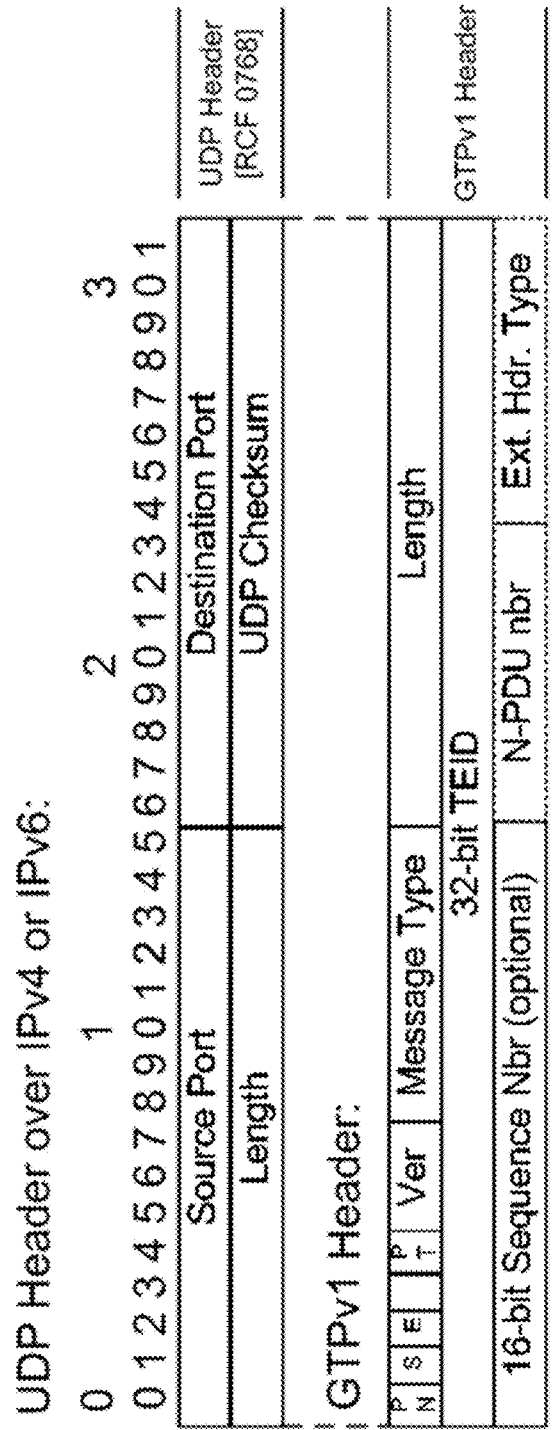
FIG. 16 illustrates GTP-U header structure.

The configuration of a PoE receiver 1310 to enable interoperation with a GTP-U node will now be discussed. For reference the GTP-U header has the structure illustrated in FIG. 16. Table 5 also illustrates aspects of the GTP-U header.

The configuration of a PoE receiver 1310 in order to handle GTP-U v1 traffic is as follows in an embodiment. Traffic is received having NG-C/management fields described in FIG. 17 and FIG. 22. These fields have two components, those shared by all formats, and those configured separately for each format.

Figure 17:
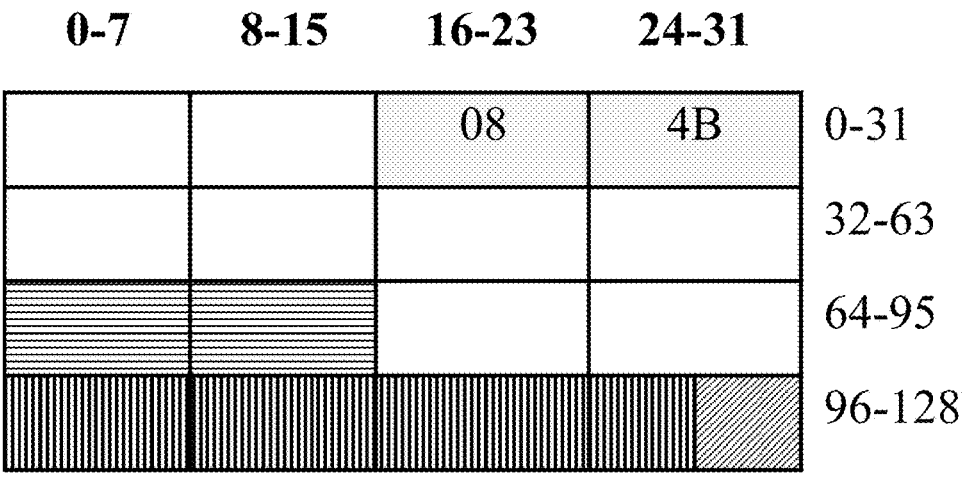
FIG. 17 illustrates the location of emulated GTP-U header fields, in accordance with an embodiment of the present invention.

FIG. 22 lists the shared parameters used in GTP-U v1 along with the location of the relevant fields. The location information is used by the PoE receiver 1310 to read the values from the received information without requiring the use of a protocol stack to enable the PoE receiver 1310 to decode GTP-U v1 traffic. FIG. 17 illustrates those same fields in graphical form. The patterns in FIG. 22 and FIG. 17 are matched for reference.

For GTP-U there are 5 acceptable formats, corresponding to 5 message types. These fields may be configured once per interface. By considering the Format ID, the location of some or all of the fields can be dynamic. Table 14 lists these five formats. The value in the Format ID column can be determined by considering the fields in the first 16 bits of the GTP-U header of the appropriate packet.

TABLE 14

Per Format Parameters for GTP-U

| Description | Format ID | Payload | SN |
|---|---|---|---|
| Basic Encapsulate | 0x30ff | 160-inf | n/a |
| Encapsulate with SN | 0x32ff | 192-inf | 160-175 |
| End Marker | 0x30fe | n/a | n/a |
| Error Report | 0x301a | n/a | n/a |
| Echo Request | 0x3001 | n/a | n/a |

After the fields listed in Table 14 have been configured into a PoE receiver 1310, the PoE receiver 1310 implementing GTP-U is ready to receive PDU session configuration parameters over the control plane and then GTP-U formatted PDUs, via a user plane interface.

Note that when PoE supports protocol selection, then the UDP components may be configured by selecting UDP as the underlying protocol, and the offset values of the GTP-U components may be updated accordingly.

In one embodiment, the configuration at a PoE sender 1305 in order to enable GTP-U v1 is as follows. There are multiple ways that a GTP-U sender could be configured. Current GTP-U does not define behavior if the length field is misconfigured. If this behavior does not result in an error, then a value in the length field is acceptable, otherwise a 'length' field should be provided by the PoE standard. The following discussion presumes the length field is required. Table 15 illustrates per-format parameters of PoE which may be used by a node implementing PoE to support GTP-U v1, according to embodiments of the present invention. "loc" represents location.

TABLE 15

Per Format Parameters for GTP-U

| Command | Fixed Field | Fixed Field loc | PDU-ID loc | QoS loc | Payload loc | SN loc | Error loc |
|---|---|---|---|---|---|---|---|
| Basic Encapsulate | 0x08680868 00680000, 0x30ff | 0-64, 64-79 | 96-119 | 120-123 | 160-inf | n/a | |
| Encapsulate with SN | 0x08680868 00680000, 0x32ff | 0-64, 64-79 | 96-119 | 120-123 | 192-inf | 160-175 | |
| End Marker | 0x08680868 00680000, 0x30fe | 0-64, 64-79 | 96-119 | 120-123 | n/a | n/a | |
| Error Report | 0x08680868 00680000, 0x301a | 0-64, 64-79 | 96-119 | 120-123 | n/a | n/a | 154-inf |

The first fixed field is a UDP header with the CRC check disabled. This header could be different if different ports are desired.

For purposes of clarity there may be some missing fixed fields in the above description. In addition to the above-described configuration, the TNL parameters are also configured with the correct IP address.

The configuration of a node to use PoE to enable interoperation with a GRE node will now be discussed. GRE by itself does not fully support the requirements of NG-U, however extensions exist. Below is an example which covers a basic encapsulation method. The handling of end markers and error reports can be done in numerous different ways including by changing the PoE node's response or by further modifying GRE headers. Tables 16 and 17 list parameters for configuring a PoE node to enable interoperation with a GRE node, according to embodiments of the present invention. These tables can be interpreted similarly to Tables 14 and 15.

TABLE 16

| Interface Parameters | Value | Location |
|---|---|---|
| IP address | 10.1.1.1 | n/a |
| NG Protocol | 0x2F | n/a |
| NG Sanity Check | Empty | Empty |
| Format ID Location | n/a | 0-15 |

TABLE 17

| Description | Format ID | PDU-ID | QoS | Payload | SN |
|---|---|---|---|---|---|
| Basic Encapsulate | 0x1000 | 64-91 | 92-95 | 96-inf | n/a |
| Encapsulate with SN | 0x1800 | 64-91 | 92-95 | 128-inf | 96-127 |
| End Marker | | | | | |
| Error Report | | | | | |

Potential characteristics of PoE are discussed below. It should be emphasized that various embodiments may exhibit different characteristics, and not all embodiments will necessarily exhibit the characteristics discussed below.

In some embodiments, as a first potential characteristic, nodes implementing PoE can be configured to interact with nodes making use of any of a number of different protocols, including protocols not yet developed at the time of this writing, provided the structure of such a protocol is fixed. That is, the PoE node can, without standardization change, be adapted over time to support new features as they arise. This flexibility allows for a given generation of network access points or base stations (such as a gNodeB (gNB) as discussed by the 3GPP in discussions of next generation (e.g. 5G) networks) to interact with subsequent designs of 3GPP nodes/interfaces, as well as with non-3GPP nodes where desired. The term gNB refers to a next generation node B, as defined by the 3GPP. It is noted that other comparable infrastructure components can be used in various embodiments. It should also be understood that nodes interacting with currently deployed access nodes, such as eNodeBs, could be implemented so that they act as PoE receivers without having an impact on the behaviour of the network.

For example, future network technologies may potentially require a gNB or other NF to communicate with nodes used to implement service function chaining (SFC). SFC has been proposed as a wide-ranging solution, for example as described in the white paper "Service Chaining in Carrier Networks", by G. Brown for Heavy Reading on behalf of Qosmos, February 2015. Currently there is interest in implementing SFCs after the Pcke GateWay (PGW) (e.g. between the base station and the PGW, but with early breakout. However, other implementations are also possible.

In other examples, future network technologies may potentially require a gNB or other NF to communicate with one or more of: WAN accelerators; SDN routers; ICN networks; Application Layer (e.g. for URLLC) or MTC nodes; and/or Virtual Private Networks and nodes thereof.

The protocols used by the above-mentioned nodes use will be ultimately up to the functions supported thereby. However, it is possible that either a unique interface, or a generic interface on top of a TNL will be chosen. Currently, it is difficult to design middle-boxes (i.e. network nodes or functions used for purposes other than packet forwarding) to seamlessly intercept or interact with GTP-U traffic. One reason for this difficulty is that GTP-U is a relatively less popular interface compared to others (i.e. IP) thus there is a smaller marketplace which drives up cost. Another reason is that the flat namespace of TEID (terminal equipment identifier) means that middle-boxes cannot reliably detect the inner protocols contained within a GTP-U header. Only some of the packets may be IP packets. Other factors complicating middle-box design are that interactions with the control plane are non-standardized and that proprietary solutions are difficult to implement if they require the support of multiple vendors.

Embodiments of the present invention therefore provide for a network node or network function which will be relatively simple to extend in future.

Another potential characteristic of PoE is reduced complexity. PoE allows for the implementation of any one of a plurality of protocols using a single configuration layer. This means that the complexity of the protocol in use can be tailored to the scenario in which it is used. For example, if, at a given node, complexity arising from processing associated with CRCs is an issue then the node can be configured so that it no longer performs the calculating and/or checking of CRCs. As another example, if latency is an issue, the node can be configured to request packets with fixed header sizes. Enforcing fixed header sizes can allow for greater parallelism, which can be used to reduce the latency at the node. As another example, if control data overhead is an issue, then the size of various fields can be limited.

Furthermore, as the formats of the headers can be negotiated ahead of time, there can be a negotiated bounding on processing delay of various packets. This is in contrast to an alternative scenario in which an a priori unknown number of extension headers can be added, which forces hardware to be designed for the worst case scenario, rather than the typical scenario.

As PoE can be implemented so that a node only requires the features in a protocol which are actively being used, rather than all those that may potentially be used, the complexity of a node can be significantly lower than the case in which devices must continuously check for optional features which are not activated. A given implementation may omit one or more optional features of a protocol, thereby reducing complexity. In other embodiments, it may be possible to ignore otherwise mandatory operations if they are not relevant to the operation of a PoE node, so long as they can be performed elsewhere without breaking the operation of the protocol on an end-to-end basis. As these capabilities can be indicated over the control plane, interoperability is still maintained.

According to some embodiments, the approach of PoE to standardization is to standardize a lower, or even minimal, amount to achieve an adequately large number of added features. The standard may thus standardize the behavior of each individual node, not how a network is configured jointly.

Many legacy changes and standardization work revolve around the changing of sizes of fields (SN in packet data convergence protocol (PDCP)) or placement of fields (QoS identifier). Some embodiments of the present invention allow removal of this side of the standardization debate so companies/delegates can focus on more relevant details, and the sizes can be customized in deployment.

Operating on the downlink, a PoE node can read fields a fixed offset from a reference position, such as the start of a packet of the start of an encapsulation layer, and the PoE node can then provide the appropriate parameters to upper layers. If desired, current GTP-U tests can be performed, with appropriate configuration. As arguably superfluous features which are currently part of GTP-U (such as CRC) may be removed in certain PoE implementations, the testing can be simplified significantly.

Another potential characteristic of PoE is deployment flexibility. By adopting PoE, a gNB can automatically support several different TNL and encapsulation protocols. Such protocols may include: GTP-U; IP in IP; virtual extensible local area network (VXLAN); GRE; multiprotocol label switching (MPLS); and network service header (NSH). The choice of an appropriate protocol for use in a given PoE implementation can be made by the CN independently of the gNB. This allows different CN/Operators to adopt designs which are adapted to their particular deployment, and change their designs as needs change, without costly standardization or product upgrade efforts. This can facilitate evolution of the CN to operate independently from the RAN.

Another potential characteristic of PoE is a reduction in overhead. Because only required features are used in a given PoE implementation, all other elements can be removed. For example, it is expected that, in some embodiments, overhead can be reduced by up to 75%.

Another potential characteristic of PoE is enabling separate evolution of the core network (CN) and radio access network (RAN). It is considered that the user plane and the control plane tie together the CN and the RAN. The control plane of a 3GPP network is relatively unique, with few to no viable contenders for design. The data plane however has a myriad of competing solutions. When embodiments of the present invention are implemented, the CN can modify the RAN user plane, allowing for the CN to be seamlessly and transparently evolved to future interfaces. 'Proprietary' solutions now potentially only require the CN's support rather than both the CN and the RAN.

Given the above design there are several features and/or solutions which are potentially supported by the data plane, according to various embodiments of the present invention. Some of these are briefly discussed below.

In some embodiments, multi-hop source based routing is supported. By configuring different layers to read different portions of the encapsulation header multi-hop forwarding is provided. Multi-hop source based routing is a method in which the data source provides routing information to intermediary nodes (handling the data) rather than having the routing determined by those intermediary nodes. In 3GPP long term evolution (LTE) types of implementations, multi-hop source based routing terms comprises embedding the packet gateway's (PGW's) address/label in the encapsulation header to the serving gateway (SGW). Thus the SGW does not need to receive any control plane signaling to determine which PGW to send a particular packet too. By configuring nodes within different network layers to read different portions of the encapsulation header, multi-hop forwarding can be provided.

In some embodiments, label popping/switching is supported. Label popping/switching can be enabled by chaining 2 PoEs together. This allows for all the features supported by other label switching solutions (MPLS, etc.).

In some embodiments, interfacing with other protocols and/or virtual local area networks (VLANs) is supported, as discussed previously.

In some embodiments, group based forwarding/accounting is supported. By configuring the location of what is read (i.e. to be a portion of the TEID) groups of PDU sessions can be forwarded/monitored without explicit standards support. This reduces signaling/context in the core.

In some embodiments, encapsulation of non-IP in IP is supported. In some MTC deployments, this may be an important feature. Small payloads using non-IP can be automatically configured to append fixed IP headers to direct traffic. (A Length field may have to be added). This allows early breakout of traffic which may have reduced need for mobility support. The headers could range from IP to HTTP (postfixes could be added as well). This may allow PDUs to always be fully formed IP packets after the RAN node. This in turn may mitigate the need for some special control plane processing.

In some embodiments, embedding information into MTC traffic is supported. The control plane can embed information into the MTC traffic through the header. This information can be carried either to the interface function or all the way to the end host. This allows for stateless functionality in the interface, and a limited (e.g. minimum) number of nodes which need to be updated. This information includes an identifier of the eNB/gNB which transmitted the packet, a device identifier, etc.

Embodiments of the present invention provide for the ability to interoperate/interact with non-3GPP or non-standardized nodes. A real network can have many nodes which are not defined by 3GPP. Such nodes may include firewalls, proxies, caches, nodes of content centric networks (CCNs) etc. As these nodes don't support GTP-U, it is difficult for other nodes to interoperate with them effectively. This is particularly true on the UL, where the gNB acts as the ingress node the network. Allowing different processing based on flow can be a fundamental differentiator between different of network slices, for example. Embodiments of the present invention therefore allow processing to be expanded beyond the limitations of 3GPP nodes as they are defined at a particular time, e.g. during a particular period of standardization effort. This allows for future extension of solutions independently of standardization efforts.

Limited changes to current standards can enable the present invention to be implemented and various design activities decoupled from the 3GPP standard. Changes to current standards can include indicating the location of the various fields which are configured, e.g. via management plane signaling.

With such limited changes to current standards, several different features can be potentially supported, for example as discussed above. For example, if the importance of SFC increases, their support will have been automatically enabled by PoE beforehand.

Embodiments of the present invention are analogous, but not identical, to software programming with software switches able so support line speed header processing (e.g. Openstack), and switching hardware supporting very configurable processing (e.g. P4).

It is also noted that GTP-U is significantly computationally complex, for example because of the UDP checksum. This checksum requires the tunneling node to load the entire PDU into memory to calculate the checksum.

It is noted that, because embodiments of the present invention allow the parsing operations to be configurable (while the protocol is held fixed) the increase in complexity in the data plane is limited.

According to embodiments of the present invention, usage of PoE nodes can enable a reduction in the number of nodes in the network (as the RAN is performing the labeling).

In some embodiments, to enable third party inspection (e.g. by Wireshark), parsing parameters can be provided to the third party as part of management plane support. If the parsing is static or semi-static in nature, the parsing parameters may be well known to the operator performing the inspection. By deliberately using different next header fields to differentiate different formats, interoperability is provided. Third party inspection can be facilitated by adaptations in the management plane.

It is expected that the amount of additional technical work which is required in order to support the present invention will be relatively small. Additional information needs to be added to the interface setup message definition, and GTP-U standards documents may need to be modified in respect of portions thereof describing the placement of fields.

Comparison of Protocols

Tables 18A, 18B and 19 present a comparison between three considered protocols, having regard to several features which are considered typically necessary for GTP-U.

TABLE 18A

Required Features for NG-U

| Feature | GTP-U | GRE | PoE |
| --- | --- | --- | --- |
| Multiplexing traffic to different UEs | Yes | Yes | Yes |
| Session QoS marking | No | No | Yes |
| Multiplexing session traffic to the same UE | No | No | Yes |
| Encapsulate standard and non-standard Protocols | Yes | Yes | Yes |
| Usable on Xn interface | ? | ? | ? |
| Reasonable Overhead | 20 Bytes | 4-16 Bytes | 4-X Bytes |
| Extensible for SFC | No | No | Yes |
| Usable with NAT | No | Yes | Yes |
| Usable with SDN | Outer IP only | Outer IP only | Yes |

TABLE 18B

Required Features for NG-U

| Feature | GTP-U | GRE | GTP-Uv2 | PoE |
| --- | --- | --- | --- | --- |
| Multiplexing traffic to different UEs | Yes | Yes | Yes | Yes |
| Session QoS marking | No | No | Yes | Yes |
| Multiplexing session traffic to the same UE | No | No | No | Yes |

TABLE 18B-continued

Required Features for NG-U

| Feature | GTP-U | GRE | GTP-Uv2 | PoE |
|---|---|---|---|---|
| Encapsulate standard and non-standard Protocols Usable on Xn interface | Yes | No | Yes | Yes |
| Reasonable Overhead | 20 Bytes | 4-16 Bytes | | 4-X Bytes |
| Extensible for SFC | No | No | No | Yes |
| Usable with NAT | No | Yes | No | Yes |
| Usable with SDN | Outer IP only | Outer IP only | Outer IP only | Yes |
| Low Complexity | No | Yes | Yes | Yes |
| Source Based Routing | No | No | No | Yes |
| Label Popping/Switching | No | No | Possibly No | Yes |
| Group based forwarding/accounting | No | No | Possibly No | Yes |
| Encapsulation for Non-IP | No | No | No | Yes |
| Embed information for MTC | Proprietary extension header | No | Possibly No | Yes |

TABLE 19

Required Features for NG-U

| Feature | GTP-U | GRE | GTP-Uv2 | PoE |
|---|---|---|---|---|
| Future Proof | No | No | | Yes |
| Separation of RAN and CN | No | Yes | No | Yes |
| Low Complexity implementation possible | Whole PDU must be loaded to memory | Yes | Possibly Yes | Yes |
| Interface with non-3GPP nodes | No | Yes | Possibly No | Yes |
| Overhead | 20+ Bytes | 4-16 Bytes | 10+ Bytes | 4-X Bytes |
| Source Based Routing | No | No | No | Yes |
| Label Popping/Switching | No | No | Possibly No | Yes |
| Group based forwarding/accounting | No | No | Possibly No | Yes |
| Transparent encapsulation for Non-IP | No | No | No | Yes |
| Embed information for MTC | Proprietary extension header | No | Possibly No | Yes |

There are several observations that can be drawn from these tables. For example, one observation is that there is currently no legacy protocol which provides all the required features (without modification).

By configuring different nodes with different field locations, a variety of features can be supported, transparently to the standard. Such features include one or more of: multi-hop source based routing, label popping/switching, interfacing with other protocols/VLANs, encapsulation of non-IP in IP (e.g. for MTC traffic), embedding of information into MTC traffic, and group based forwarding/accounting.

The locations of where in a header to find different fields can be configured. The configuration instruction may be carried over the control plane. There are many ways that this location can be expressed. There are several different features which may be added to enhance this mapping. Approaches for expressing location include: a length/offset method; an adaptable protocol layer method (in which PoE may run above different protocol layers (IP, UDP, Ethernet)); a mixed semi-static/dynamic method (in which some portions of the fields may be configured semi-statically, while others depend on the individual messages); and a fragmented method (in which the field used may be fragmented in several sections of the PDU).

In the length/offset method, the fields are expressed as simple length offsets from a fixed point.

The following pseudo-code illustrates implementation of the adaptable protocol layer method.

```
Protocol_Layer ::= ENUMERATED
{
    IP (0)
    L2 (1)
    UDP  (2)
    RB_context (3)
    ...
}
Protocol_Layer_Loc ::= ENUMERATED
{
Beginning (0)
End (0) ...
}
Field::= SEQUENCE {
    protocol_layer_ref Protocol_Layer,
    protocol_layer_loc Protocol_Layer_Loc
    offset                           INTEGER,
    length INTEGER,
    bitstring BITSTRING,
}
device_ID_location ::= SEQUENCE(SIZE(0..4)) of Field
QoS_location ::= SEQUENCE(SIZE(0..4)) of Field
Count_location ::= SEQUENCE(SIZE(0..4)) of Field
Payload_loc ::= SEQUENCE(SIZE(0..4)) of Field
```

An example single field solution supporting location field formatting will now be described. Associated with each PDU is a PDU session. As part of the PDU session are the fields, for example as expressed previously with respect to Table 12.

The PDU transmit entity builds an IP header using parameters associated with the PDU session including the 'Encapsulation Protocol field'. It then builds a PoE header using the 'Encapsulation Header' field directly i.e. the 'Encapsulation Header' field is used directly as the PoE header.

Figure 18:
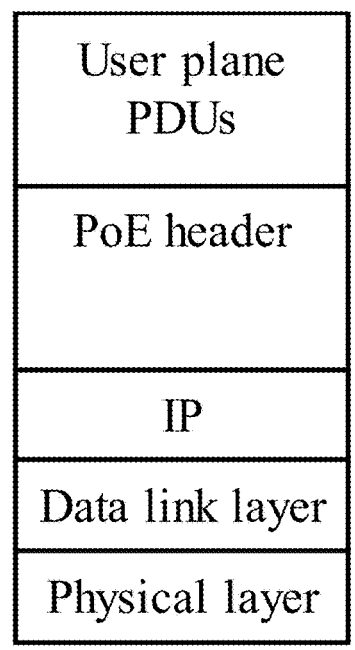
FIG. 18 illustrates a header configuration, in accordance with an embodiment of the present invention.

FIG. 18 illustrates this header configuration, for clarity.

It is noted that, in the present example, there is no requirement for the encapsulating entity to be able to interpret/parse this PoE header. The entity simply receives the 'Encapsulation Header' (a bytestring) over NG-C and appends it to the PDU. The granularity of the header may be finer than that of a PDU session. For instance the granularity of the header may be at the granularity of the QoS, thus different headers (and potentially TNL parameters) may be applied for different QoS values.

Variations and Enhancements

The solutions above have focused primarily on a 'pure' PoE implementation, in which all protocol layers above IP are designated using PoE. Alternatively, embodiments of the present invention provide for hybrid solutions to enable reuse of underlying protocols.

In such embodiments, a PoE receiver/sender is configured to be 'at' a particular protocol layer. The sender/receiver binds itself to that layer with the appropriate configurations. For instance, the Interface configuration contains a field called 'protocol stack' which contains a series of protocols and their appropriate parameters. Some examples are illustrated in Table 20.

TABLE 20

Example protocols and parameters

| Protocol | Parameters |
|---|---|
| UDP | Port number |
| IP | Address |
| TCP | Port number |
| GTP-U | TEID |
| GRE | Key, optional features to enable (SN, key, etc.) |

In some embodiments, dynamic field locations can be incorporated into another protocol, such as a future version of GTP-U.

In some embodiments, a future version of GTP-U (e.g. GTP-Uv2) can incorporate a Semi-static configuration of parameters, similar to that discussed above. The interface may then semi-statically configure the size of the different fields. For example, a trade-off between the sizes of the PDU Session identifier, and QoS fields may be performed. This does not require the resulting header to be a well formed GTP-U v1 packet.

In some embodiments, an API based NG-U is provided. In this approach within standards, the NG-U is defined as an API. The fulfillment of that API is left to vender/operator agreements. The API could be CORBA, or SWIG, for example.

In some embodiments, GTP-Uv1 may be configured to incorporate a semi-static configuration of parameters. This approach requires that the PDU is still a 'well formed' GTP-U packet. An adaptation layer may then be provided, in which the underlying protocols are left unchanged (GTP-U, GRE, TCP, etc.), and a mapping from the NG-U inputs to the fields in those protocols is defined.

Further details of such an adaptation layer, according to some embodiments, will now be described. The adaptation layer maps the requirements of NG-U to other protocol layers. The adaptation layer (which may be required to be identical on both sides of a link) describes the mapping and de-mapping from the NG-U parameters (e.g. SDU session identifier, QoS, SN etc.) to the GTP-U parameters (e.g. UDP source port number, TEED, SN, extension headers). This mapping is specified as a different document from GTP-U. Different adaptation layers may exist for different protocols.

The adaptation layer can be configurable or non-configurable. If configurable, the configuration may be performed in a PoE method or simply having semi-static sizing of parameters. Using GTP-U as an example we extract the fields over which data can be carried. These fields include, for example: UDP source port number; TEID; SN; and Extension Headers.

In some embodiments, arbitrary bits can be put in these headers, and the result will still be a well-formed GTP-U packet. Thus, a variable length string is provided to which data can be mapped. A PoE operation or similar operation can then be performed to map data to this string.

Using GRE as an example, the fields over which data can be carried can be extracted. These fields include a key and a SN. Thus, a string that can either be 0, 32, or 64 bits in length (depending on activation of key and SN) is provided. Arbitrary bits can be put in these headers, and the result is still a well-formed GRE packet. Thus, as before a variable length string to which data can be mapped is provided. A PoE operation or similar operation can then be performed to map data to this string. To support additional fields, a mapping of 'flexible fields' to the string can be provided.

Other examples include: MPLS (or multi-level MPLS for larger string sizes); IPv6 (flow ID field, etc.); UDP (port numbers); and TCP (port numbers, extension headers etc.).

Example 1

Embodiments of the present invention comprise operating PoE on top of GTP-U, at one or more network nodes. The 3GPP standards document entitled "3rd Generation Partnership Project; Technical Specification Group Core Network and Terminals; General Packet Radio System (GPRS) Tunnelling Protocol User Plane (GTPv1-U) (Release 13)", 3GPP TS 29.281, V13.2.0, June 2016 can be modified as described below to accommodate such embodiments.

First, in addition to defining UDP/IP to transfer GTP messages (see Section 4.4.1 of 3GPP TS 29.281); a second protocol path can be made available for GTP messages. In particular, the second protocol path bypasses the UDP layer, and is bound to the IP layer using a next header field configured over the control plane.

Second, the general format of the GTP-U header (See Section 5.1 of 3GPP TS 29.281) can be modified to further include fixed fields, which are opaque bitfields that are defined over the control plane. Control plane configuration of fields is described as follows. The mapping of GTP-U header fields to the encapsulation header is governed by an ordering configuration associated with each field, which is signaled over the control plane. An ordering configuration may contain either a unique integer per named field, indicating the order in which those fields are mapped to the GTP-U header, with smaller integers placed before larger integers. The value 0 indicates that the field is not in the header, that field is either ignored as described below or a default value is supplied over the control plane which the GTP-U receiver presumes for all headers. For example, the field configuration in Table 21 results in the output in FIG. 19. FIG. 19 is a reproduction of FIGS. 5.1-1 of the above-cited document 3GPP TS 29.281 and in that sense is prior art. However, it is also noted the presently discussed embodiment of the invention is configured to provide output which matches this prior art behaviour, albeit by a different mechanism involving PoE.

TABLE 21

Example Field Configuration for GTP-U Header for 3GPP TS 29.281

| Field | Order |
|---|---|
| Version | 1 |
| PT | 2 |
| Fixed Field 1 | 3 |
| E | 4 |
| S | 5 |
| PN | 6 |
| Message Type | 7 |
| Length | 8 |
| Tunnel Endpoint Identifier | 9 |
| Sequence Number | 10 |
| N-PDU Number | 11 |
| Next Extension Header Type | 12 |

When a field is configured with an order value of 0, and a default value is supplied, the GTP-U receiver behaves as if that default value was indicated over that GTP-U header. All fields could conceivably be configured with a default value.

Some fields have special behavior when they are configured with an order value 0 and are not supplied with a default value, as illustrated in Table 22.

Some fields can be signalled once over the control plane, configuring default parameters, others may not be configured with a default value.

Always present fields must at least be configured by a default parameter if they are absent from the header field.

TABLE 22

Field Behaviour

| Field | Behaviour when absent |
|---|---|
| Length | When not provided the length field is calculated from the underlying protocols (UDP) length field. |
| Sequence Number | If the Sequence number field it not provided then the S parameter must similarly be set to a default value of '0'. |
| N-PDU Number | If the N-PDU Number field it not provided then the PN parameter must similarly be set to a default value of '0'. |
| Next Extension Header Type | If the field is marked absent in the configuration then the E field must be set to '0'. |

If a particular interface requires a protocol field which is not configured, an error may be reported in the control plane. Note that for a GTP-U sender entity there are no required fields for encapsulation.

Example 2

An alternative approach to the control plane configuration of fields as described in the above example is as follows. The mapping of GTP-U header fields to the encapsulation header is governed by two parameters associated with each field, which are signalled over the control plane. The two parameters are an "ordering" parameter and an "offset" parameter.

The ordering parameter field may contain either a unique integer per named field, indicating the order in which those fields are mapped to the GTP-U header, with smaller integers placed before larger integers. The value 0 indicates that the field is not in the header, that field is either ignored as described above or a default value is supplied over the control plane which the GTP-U receiver presumes for all headers.

The offset parameter field represents the location of this field from the first bit in the protocol header. When an optional field is indicated to be present, the offset is shifted if the order parameter for that optional field is configured to be lower than the ordering field considered.

For example, the configuration in Table 23 results in the output in FIG. 19.

TABLE 23

Example Field Configuration for GTP-U Header for 3GPP TS 29.281 using Offsets

| Field | Order | Offset |
|---|---|---|
| Version | 1 | 0 |
| PT | 1 | 3 |
| Fixed Field 1 | 1 | 4 |
| E | 1 | 5 |
| S | 1 | 6 |
| PN | 1 | 7 |
| Message Type | 1 | 8 |
| Length | 1 | 16 |
| Tunnel Endpoint Identifier | 1 | 32 |
| Sequence Number | 2 | 64 |
| N-PDU Number | 3 | 64 |
| Next Extension Header Type | 4 | 64 |

Figure 20:
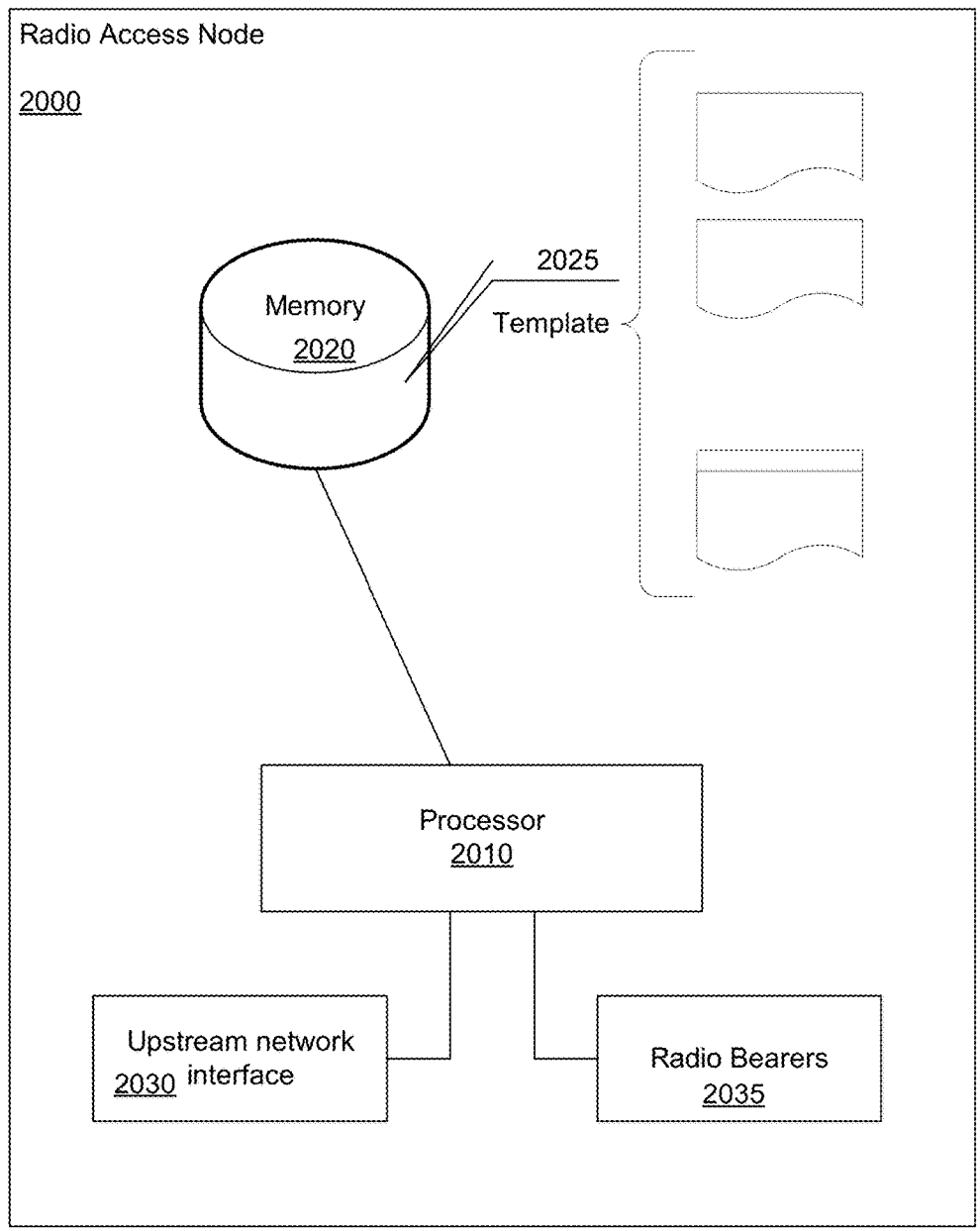
FIG. 20 is a block diagram illustrating a radio access node for carrying out methods disclosed herein.

FIG. 20 is a block diagram illustrating a radio access node 2000 for carrying out the method discussed above. A processor 2010 receives packets as a bitstream from one of the upstream network interface (for downstream communications), or (for upstream communications) from the radio bearers (which may be implemented as an interface to a remote radio head, or to a different networking element within the RA node). The processor 2010 extracts data elements from the received bitstream and uses this extracted information to select a template 2025 stored in a locally accessible memory 2020. This template 2025 may instruct the processor 2010 to extract further information from the bitstream to allow for the population of the relevant encapsulation fields, or the selection of the relevant radio bearer as the case may be. The received bitstream is processed in accordance with the selected template and transmitted over one of the upstream interface 2030 and the radio bearers 2035.

Embodiments of the present invention may comprise supporting the linkage between the RA node and the core network.

Embodiments of the present invention may comprise supporting the creation of new or revised encapsulation protocols. This may be done by having the RA node updated through changes to the template format. The updated format may correspond to the updated format of different encapsulation protocols. Thus, legacy RA may be reconfigured without software change.

Embodiments of the present invention may comprise configuring a RA node to spoof or mimic protocols used by other nodes, such as network address translation nodes, GRE ingress nodes, and MPLS egress nodes. As such, the RA node may, through appropriate field configuration, approximately spoof or follow the format of a particular protocol or set of protocols.

Embodiments of the present invention may be supported as a feature of a standardized communication protocol system or as a non-standardized feature.

In some embodiments, there may be multiple length fields associated with a PoE header. A length field is defined as the distance between a point (indicated as an offset) to the end of the entire packet. These length fields can be provided, for example, in order to enable the use of length fields in headers such as IP/UDP or even Ethernet.

Figure 21:
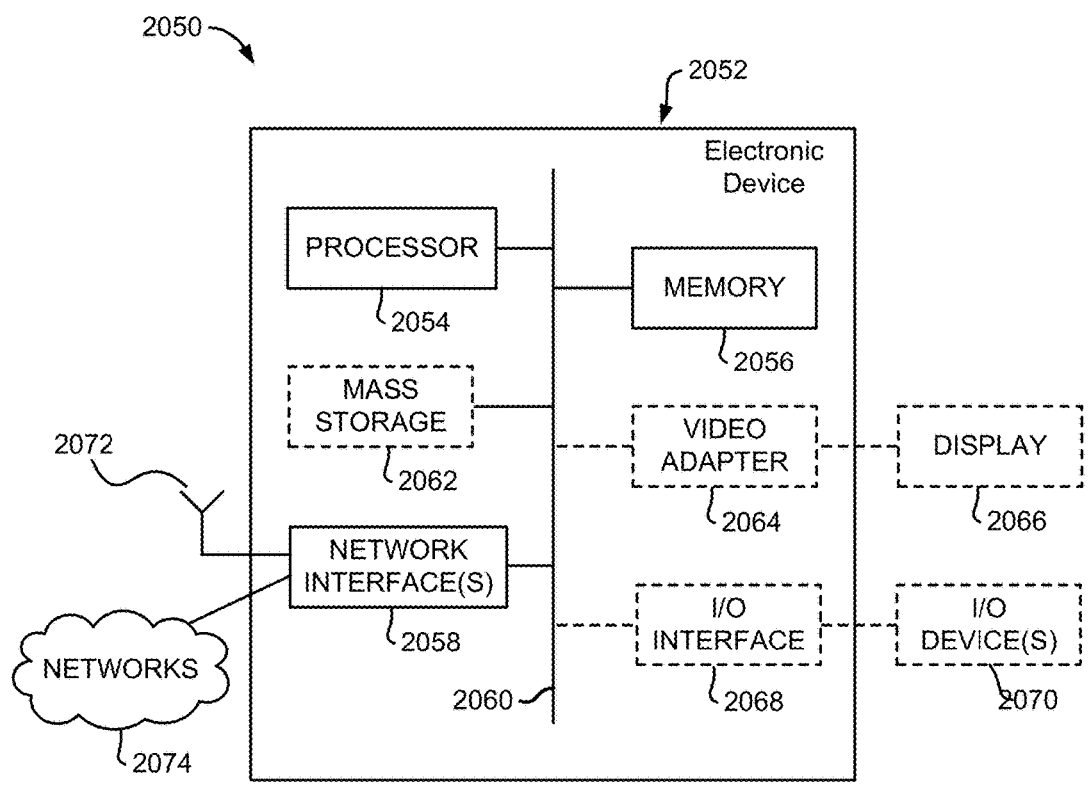
FIG. 21 is a block diagram of an electronic device within a computing and communications environment that may be used for implementing devices and methods in accordance with representative embodiments of the present invention.

FIG. 21 is a block diagram of an electronic device (ED) 2052 illustrated within a computing and communications environment 2050 that may be used for implementing the devices and methods disclosed herein. In some embodiments, the electronic device may be an element of communications network infrastructure, such as a base station (for example a NodeB, an enhanced Node B (eNodeB), a next generation NodeB (sometimes referred to as a gNodeB or gNB), a home subscriber server (HSS), a gateway (GW) such as a packet gateway (PGW) or a serving gateway (SGW) or various other nodes or functions within an evolved packet core (EPC) network.

Specific devices may utilize all of the components shown or only a subset of the components, and levels of integration may vary from device to device. Furthermore, a device may contain multiple instances of a component, such as multiple processors, memories, transmitters, receivers, etc. The electronic device 2052 typically includes a processor 2054, such as a Central Processing Unit (CPU), and may further include specialized processors such as a Graphics Processing Unit (GPU) or other such processor, a memory 2056, a network interface 2058 and a bus 2060 to connect the components of ED 2052. ED 2052 may optionally also include components such as a mass storage device 2062, a video adapter 2064, and an I/O interface 2068 (shown in dashed lines).

The memory 2056 may comprise any type of non-transitory system memory, readable by the processor 2054, such as static random access memory (SRAM), dynamic random access memory (DRAM), synchronous DRAM (SDRAM), read-only memory (ROM), or a combination thereof. In an embodiment, the memory 2056 may include more than one type of memory, such as ROM for use at boot-up, and DRAM for program and data storage for use while executing programs. The bus 2060 may be one or more of any type of several bus architectures including a memory bus or memory controller, a peripheral bus, or a video bus.

The electronic device 2052 may also include one or more network interfaces 2058, which may include at least one of a wired network interface and a wireless network interface. As illustrated in FIG. 1, network interface 2058 may include a wired network interface to connect to a network 2074, and also may include a radio access network interface 2072 for connecting to other devices, such as UE, over a radio link. When ED 2052 is network infrastructure, the radio access network interface 2072 may be omitted for nodes or functions acting as elements of the Core Network (CN) other than those at the radio edge (e.g. an eNB). When ED 2052 is infrastructure at the radio edge of a network, both wired and wireless network interfaces may be included. The network interfaces 2058 allow the electronic device 2052 to communicate with remote entities such as those connected to network 2074.

The mass storage 2062 may comprise any type of non-transitory storage device configured to store data, programs, and other information and to make the data, programs, and other information accessible via the bus 2060. The mass storage 2062 may comprise, for example, one or more of a solid state drive, hard disk drive, a magnetic disk drive, or an optical disk drive. In some embodiments, mass storage 62 may be remote to the electronic device 2052 and accessible through use of a network interface such as interface 2058. In the illustrated embodiment, mass storage 2062 is distinct from memory 2056 where it is included, and may generally perform storage tasks compatible with higher latency, but may generally provide lesser or no volatility. In some embodiments, mass storage 2062 may be integrated with a heterogeneous memory 2056.

The optional video adapter 2064 and the I/O interface 2068 (shown in dashed lines) provide interfaces to couple the electronic device 2052 to external input and output devices. Examples of input and output devices include a display 2066 coupled to the video adapter 2064 and an I/O device 2070 such as a touch-screen coupled to the I/O interface 2068. Other devices may be coupled to the electronic device 2052, and additional or fewer interfaces may be utilized. For example, a serial interface such as Universal Serial Bus (USB) (not shown) may be used to provide an interface for an external device. Those skilled in the art will appreciate that in embodiments in which ED 2052 is part of a data center, I/O interface 2068 and Video Adapter 2064 may be virtualized and provided through network interface 2058.

In some embodiments, electronic device 2052 may be a standalone device, while in other embodiments electronic device 2052 may be resident within a data center. A data center, as will be understood in the art, is a collection of computing resources (typically in the form of servers) that can be used as a collective computing and storage resource. Within a data center, a plurality of servers can be connected together to provide a computing resource pool upon which virtualized entities can be instantiated. Data centers can be interconnected with each other to form networks consisting of pools computing and storage resources connected to each by connectivity resources. The connectivity resources may take the form of physical connections such as Ethernet or optical communications links, and in some instances, may include wireless communication channels as well. If two different data centers are connected by a plurality of different communication channels, the links can be combined together using any of a number of techniques including the formation of link aggregation groups (LAGs). It should be understood that any or all of the computing, storage and connectivity resources (along with other resources within the network) can be divided between different sub-networks, in some cases in the form of a resource slice. If the resources across a number of connected data centers or other collection of nodes are sliced, different network slices can be created.

In some embodiments, a radio access node is provided. The radio access node comprising a wireless communication interface, a network interface, a memory, and a microprocessor, the radio access node configured to encapsulate uplink packets received via the wireless communication interface, according to the any of the above encapsulation methods.

In some embodiments, a radio access node is provided. The radio access node comprising a wireless communication interface, a network interface, a memory and a microprocessor, the radio access node configured to decapsulate downlink packets, according to the any of the above decapsulation methods.

In some embodiments, a method is provided for configuring a radio access node, comprising a configuration controller, generating and transmitting configuration information to the radio access node, wherein the configuration information is indicative of one or more encapsulation or decapsulation operations to be performed by the radio access node on packets received thereby, the configuration information specifying the one or more encapsulation or decapsulation operations to be performed by the radio access node independent of, i.e. without access to, protocols originally used in formatting, or subsequently to read, the packets.

In some embodiments, a controller node is provided. The controller node comprising a network interface, a memory and a microprocessor, the controller node communicatively coupled to a radio access node via the network interface, the controller node configured to configure the radio access node according to the above methods for configuring a radio access node.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

I claim:

1. A method for handling a packet by a radio access (RA) node, the method comprising the RA node:
 receiving the packet as a bitstream of data;
 associating the packet with configuration information based on data outside the bitstream; and, performing packet handling operations on the packet, without the RA node using the protocol with which the packet has been encoded, according to packet handling instructions defined by the configuration information, wherein the packet handling instructions specify a packet handling operation to be performed on a portion of the bitstream, and specify an offset indicative of an offset bit located a count of bits from a predetermined starting bit position within the packet; and a length indicative of the bitstream as a count of bits from the offset bit.

2. The method according to claim 1, wherein the data outside the bitstream of the packet comprises a radio bearer associated with the packet.

3. The method according to claim 1, wherein the packet handling instructions comprise fixed rules, and wherein the packet handling operations apply the fixed rules to the bitstream.

4. The method according to claim 3, wherein the fixed rules indicate data in the bitstream and indicate the packet handling operations to be performed on that data.

5. The method according to claim 1, further comprising the RA node receiving the configuration information from a controller node.

6. The method according to claim 1, further comprising the RA node transmitting the packet as directed or modified by the packet handling instructions.

7. The method according to claim 1, wherein the packet handling operations comprise one or more encapsulation operations.

8. The method according to claim 1, wherein the packet comprises an uplink packet, and wherein the packet handling operations include the RA node appending or prepending an encapsulation header onto the uplink packet.

9. The method according to claim 1, wherein the one or more packet handling operations comprise one or more decapsulation operations.

10. The method according to claim 1, wherein the packet comprises a downlink packet intended for a user equipment (UE), and wherein the packet handling operations further comprise the RA node:
retrieving a payload from the packet; and,
transmitting at least payload contents based on the payload to the UE.

11. The method according to claim 1, wherein the packet comprises a downlink packet, and wherein the packet handling operations performed by the RA node comprise:
reading a radio bearer identifier (RB-ID) located an offset number of bits within the downlink packet, the offset specified by the configuration information;
mapping the downlink packet to a radio bearer based at least in part on the RB-ID;
reading a payload from the downlink packet; and
transmitting the payload toward the radio bearer.

12. The method according to claim 1, wherein the predetermined starting bit position comprises a starting bit of the packet.

13. The method according to claim 1, wherein performing the packet handling operations comprises performing one or more actions of a standardized set of actions on the packet.

14. The method according to claim 1, wherein the portion of the bitstream on which the packet handling operation is to be performed is configurable by the RA node:
receiving updated configuration information, the updated configuration information specifying an updated portion of the bitstream; and,
replacing the configuration information with the updated configuration information.

15. A network function comprising:
a network interface for receiving data from and transmitting data to network functions connected to a network;
a processor; and
a non-transient memory for storing instructions that when executed by the processor cause the network function to be configured to:
receive a packet as a bitstream of data;
associate the packet with configuration information based on data outside the bitstream of the packet; and,
perform packet handling operations on the packet, without the network function having to process the packet using the protocol with which the packet has been encoded, according to packet handling instructions defined by the updated configuration information, wherein the packet handling instructions specify a packet handling operation to be performed on a portion of the bitstream, and specify an offset indicative of an offset bit located a count of bits from a predetermined starting bit position within the packet; and a length indicative of the bitstream as a count of bits from the offset bit.

16. The network function according to claim 15, wherein the data outside the bitstream of the packet comprises a radio bearer associated with the packet.

17. The network function according to claim 15, wherein the packet handling instructions comprise fixed rules, and wherein the packet handling operations apply fixed rules to the bitstream.

18. The network function according to claim 17, wherein the fixed rules indicate data in the bitstream and indicate the packet handling operations to be performed on that data.

19. The network function according to claim 15, further operative to receive the configuration information from a controller node.

20. The network function according to claim 15, further operative to transmit the packet as directed or modified by the packet handling instructions.

21. The network function according to claim 15, wherein the packet handling operations comprise one or more encapsulation operations.

22. The network function according to claim 15, wherein the packet comprises an uplink packet, and wherein the network function is further operative to append or prepend an encapsulation header onto the uplink packet.

23. The network function according to claim 15, wherein the one or more packet handling operations comprise one or more decapsulation operations.

24. The network function according to claim 15, wherein the packet comprises a downlink packet intended for a user equipment (UE), and wherein the network function is further operative to:
retrieve a payload from the packet; and,
transmit at least payload contents based on the payload to the UE.

25. The network function according to claim 15, wherein the packet comprises a downlink packet, and wherein the packet handling operations performed by the network function further include the network function being operative to:
read a radio bearer identifier (RB-ID) located an offset number of bits within the downlink packet, the offset specified by the configuration information;
map the downlink packet to a radio bearer based at least in part on the RB-ID;
read a payload from the downlink packet; and
transmit the payload toward the radio bearer.

26. The network function according to claim 15, wherein the predetermined starting bit position comprises a starting bit of the packet.

27. The network function according to claim 15, wherein performing the packet handling operations comprises performing one or more actions of a standardized set of actions on the packet.

28. The network function according to claim 15, wherein the portion of the bitstream on which the packet handling operation is to be performed is configurable by the network function being further operative to:
   receive updated configuration information, the updated configuration information specifying an updated portion of the bitstream; and,
   replace the configuration information with the updated configuration information.

\* \* \* \* \*

UNITED STATES PATENT AND TRADEMARK OFFICE
CERTIFICATE OF CORRECTION

PATENT NO. : 10,374,947 B2
APPLICATION NO. : 15/715454
DATED : August 6, 2019
INVENTOR(S) : Aaron James Callard Page 1 of 1

It is certified that error appears in the above-identified patent and that said Letters Patent is hereby corrected as shown below:

In the description

Column 25, Line 41:
"destination is the 96 bits from the begining in EP v4. For"
Should read:
--destination is the 96 bits from the beginning in IP v4. For--

Column 25, Line 42:
"IPv6 the TED is 192 bits from the beginning of the PDU."
Should read:
--IPv6 the TEID is 192 bits from the beginning of the PDU.--

Column 45, Line 43:
"source port number, TEED, SN, extension headers). This"
Should read:
--source port number, TEID, SN, extension headers). This--

Signed and Sealed this
Twenty-fourth Day of March, 2020

Andrei Iancu
*Director of the United States Patent and Trademark Office*